US012630157B2

(12) United States Patent
Deschênes-Villeneuve et al.

(10) Patent No.: US 12,630,157 B2
(45) Date of Patent: May 19, 2026

(54) SAFE VEHICLE SPEED LIMITER

(71) Applicant: Canada Inc., Montreal (CA)

(72) Inventors: Laurence Deschênes-Villeneuve, Laval (CA); Jonathan Lécuyer L'Esperance, LaSalle (CA); Gabriel Paquin Lefebvre, Montreal (CA)

(73) Assignee: 7980302 Canada Inc., Montréal (CA)

( * ) Notice: Subject to any disclaimer, the term of this patent is extended or adjusted under 35 U.S.C. 154(b) by 103 days.

(21) Appl. No.: 18/622,387

(22) Filed: Mar. 29, 2024

(65) Prior Publication Data

US 2024/0326807 A1 Oct. 3, 2024

Related U.S. Application Data

(60) Provisional application No. 63/455,541, filed on Mar. 29, 2023.

(51) Int. Cl.
B60W 30/14 (2006.01)

(52) U.S. Cl.
CPC ....... B60W 30/146 (2013.01); B60W 2540/10 (2013.01)

(58) Field of Classification Search
CPC .......................... B60W 30/146; B60W 2540/10
See application file for complete search history.

(56) References Cited

U.S. PATENT DOCUMENTS 5,445,126 A 8/1995 Graves, Jr.
5,553,589 A * 9/1996 Middleton ............ F02D 31/007
123/352

5,774,820 A 6/1998 Linden
6,021,370 A * 2/2000 Bellinger ................ F02D 41/10
701/110

(Continued)

FOREIGN PATENT DOCUMENTS

CN 106438060 A * 2/2017 ............ F02D 11/107
JP 3050063 3/2000

OTHER PUBLICATIONS

Machine translation of CN-106438060-A (Year: 2017).*

(Continued)

*Primary Examiner* — Navid Z. Mehdizadeh
*Assistant Examiner* — Caitlin R Mccleary
(74) *Attorney, Agent, or Firm* — TILLMAN WRIGHT, PLLC; Chad D. Tillman

(57) ABSTRACT

An intelligent speed adaptor (ISA) system includes a pedal interface configured to receive accelerator pedal sensor (APS) signals output from a pedal sensor and provide the output APS signals to an engine control module (ECM). The system is configured to modify the output APS signals by changing an indicated position of the accelerator pedal before being provided to the ECM, whereby the ISM system limits the speed of the vehicle to an allowed speed that is determined by the ISA system. Preferably, the pedal interface includes a first signal-processing circuit for modifying digital APS signals and a second signal-processing circuit for modifying analog APS signals and is configured to detect whether an APS signal is digital or analog and profile ranges of pedal movement. The system further includes a signal generator for generating reference signals for calibration; and a mechanical relay for bypassing the pedal interface.

20 Claims, 14 Drawing Sheets

(56)                References Cited

U.S. PATENT DOCUMENTS

| 7,272,469 B2 | 9/2007 | Kalau |
| 7,957,882 B2 | 6/2011 | Morisset |
| 8,204,646 B2 | 6/2012 | Morisset |
| 8,290,680 B2 | 10/2012 | Morisset |
| 9,085,237 B2 | 7/2015 | Kii et al. |
| 9,827,986 B2 | 11/2017 | Pilutti et al. |
| 9,956,877 B2 | 5/2018 | Nakade |
| 10,029,685 B1 | 7/2018 | Hubbard et al. |
| 10,417,910 B2 | 9/2019 | Scofield et al. |
| 10,479,200 B2 | 11/2019 | Morisset |
| 10,576,979 B2 | 3/2020 | Knoller |
| 10,607,094 B2 | 3/2020 | Kunze et al. |
| 10,896,337 B2 | 1/2021 | Sergeev |
| 10,937,321 B2 | 3/2021 | Endo et al. |
| 11,030,898 B2 | 6/2021 | Zhang et al. |
| 11,106,925 B2 | 8/2021 | Pogorelik |
| 11,170,237 B2 | 11/2021 | Schutzmeier et al. |
| 11,183,055 B2 | 11/2021 | Zhang et al. |
| 11,702,083 B2 | 7/2023 | Lefebvre et al. |
| 2002/0190854 A1 | 12/2002 | Swan |
| 2005/0075829 A1 | 4/2005 | Polimadei |
| 2007/0001830 A1 | 1/2007 | Dagci et al. |
| 2011/0128014 A1* | 6/2011 | Harrison ............... G01D 5/145 |
| | | 324/629 |
| 2015/0355637 A1 | 12/2015 | Morisset |
| 2018/0109655 A1* | 4/2018 | Ichimura ........... G05B 19/4185 |
| 2019/0039456 A1* | 2/2019 | Mayers ................ B60W 10/06 |
| 2019/0236863 A1 | 8/2019 | Kwak |
| 2022/0144224 A1* | 5/2022 | Tarandek ................ G05G 5/03 |
| 2022/0176957 A1 | 6/2022 | Tamilarasan |

OTHER PUBLICATIONS

"ADAS Map Speed Limits", Exhibit E, TomTom (10 pages).
"Intelligent Speed Assistance" Exhibit C, TomTom (6 pages).
"Learning the Lessons of the European ISA Mandate" Exhibit D, TomTom (13 pages).
"Qualitative assessment of Intelligent Speed Adaptation (ISA) systems" Exhibit F, Unger, Thomas, Schubert, Angela, Oct. 22, 2018 (47 pages).
Regulations European Commission, Commission Delegated Regulation, Exhibit B, Mar. 31, 2021 (8 pages).
Regulations, Official Journal of the European Union, Exhibit A, Nov. 17, 2021 (161 pages).

* cited by examiner

FIG. 1

| ISA System Mode | Description |
|---|---|
| safe mode, also called inactive mode  (this is the default mode) | • Vehicle will be able to go over the safe speed limit • APS signal mechanically connected to the ECM and do not go through the pedal controller • Cruise Control won't be deactivated if the vehicle is going over the safe speed limit |
| active mode | • Vehicle won't be able to go over the safe speed limit • APS signal will go through the pedal controller and will be modulated when reaching the safe speed limit • Cruise Control will be deactivated if the vehicle is going over the safe speed limit |

Table 700

FIG. 7

SAFE VEHICLE SPEED LIMITER

COPYRIGHT STATEMENT

BACKGROUND OF THE INVENTION

The invention generally relates to intelligent speed adaptor (ISA) systems—or sometimes as intelligent speed adaptation systems or intelligent speed assistance systems. ISA systems are electronic speed management systems for vehicles designed to further compliance by drivers with speed limits. The vehicle may be a motor vehicle such as, for example, an automobile, truck, or semi-truck. It is further contemplated that at least some embodiments of the present invention have utilization with not only internal combustion motor vehicles but also electric vehicles. There are three general categories of ISA systems: open ISA systems; half-open ISA systems; and closed ISA systems (also referred to herein as active ISA systems). Open ISA systems (sometimes referred to herein as advisory ISA systems) provide an alert whether visible and/or audible to a driver when a speed limit is exceed and rely upon the driver to decrease the vehicle's speed; half-open ISA systems provide an alert and also temporarily limit the vehicle's capability to exceed the speed limit or make it more difficult to exceed the speed limit by the driver, such as by increasing the force countering depression of an accelerator pedal by a driver; and active ISA systems limit the speed automatically, overriding a driver's actions causing the speeding, such as by altering acceleration control signals that are sent from an accelerator pedal to an ECM. The present invention particularly relates to active ISA systems in which signals provided from an accelerator pedal sensor (APS) for receipt by an engine control module (ECM) are modified by an active ISA system in order to prevent a driver from driving the vehicle at a speed beyond an allowed maximum speed limit. By modifying signals, when appropriate, the ISL system is able to avoid or at least minimize speeding of the vehicle.

Preferred embodiments of the invention relate to active ISA systems that limit the speed of a vehicle in real time according to its location on the road network. It is believed that widespread adoption of active ISA systems would improve the overall safety of the road network for all users. Indeed, a study conducted by the European Transport Safety Council indicates that 30% of fatal accidents are due to speeding and 82% of them happened on secondary roads. A vehicle equipped with an active ISA system would significantly reduce accidents related to speed. There has been, over the last few years, mass adoption of advisory ISA systems, especially in the transportation industry; however, an independent study done by the University of LEEDS has found that there is limited impact on the overall reduction of road accidents. Advisory ISA systems essentially warn the driver with a visual or audio notification when they go over the speed limit. According to the same study, an active ISA system would reduce fatal accidents by 50%. This is because active ISA systems actually prevent the vehicle from going over the safe speed limit as opposed to only providing a warning to the driver.

As of the current time, active ISA systems have not received widespread adoption in the transportation industry. It is believed that this is because previous attempts did not address the following issues: (1) an active ISA system should be compatible with most if not all vehicles; (2) an active ISA system should be safe at all times; and (3) an active ISA system should be able to operate in the harsh environment of the automotive industry. One or more preferred embodiments of active ISA systems in accordance with one or more aspects and features of the invention are believed to address one or more of these issues.

Regarding the first issue, it is believed that mechanisms and methods in accordance with one or more aspects and features of the invention will render active ISA systems compatible for use with most types of vehicular pedals. Regarding being safe all of the time, in accordance with one or more aspects and features of the invention, an active ISA system is designed in such a way that the only possible outcome of any scenario is speed reduction and nothing else, meaning that it would be impossible to generate an undesirable acceleration. Lastly, it is important to make sure that the choice of physical components of the system are automotive-ready, meaning that they can operate within a temperature range of −40 Celsius to +85 Celsius without unreasonable loss of precision. Even with careful part selection, components will have various manufacturing tolerances, and temperature sensitivity, and their measure may drift over time. To compensate for those errors, in accordance with one or more aspects and features of the invention, an active ISA system utilizes an ongoing calibration process for achieving a high level of system reliability.

Speed management is also complex for an organization that manages a fleet of multiple vehicle brands. There are significant advantages to having one system that is compatible with all the various vehicle makers. Such a system would decrease the complexity for the company to manage individually all those interfaces. While this value proposition is simple, the solution of achieving mass adoption of active ISA systems is not. In accordance with one or more aspects and features of the invention, an active ISA system offers the fleet operator a simple web/mobile-based interface to modify the speed settings of any of its vehicle fleets for all the various driving contexts. The speeds may be determined within the context of, inter alia, the driving instance of the vehicle.

SUMMARY OF THE INVENTION

The invention includes many aspects and features.

In an aspect of the invention, a vehicle comprises a pedal with a pedal sensor that is configured to output accelerator pedal sensor (APS) signals, at least one of which indicates a position of the accelerator pedal; an engine control module (ECM) that is configured to effect acceleration of the vehicle at different rates as a function of a position of the accelerator pedal indicated by an APS signal; and an intelligent speed adaptor (ISA) system that is configured to receive APS signals output from the pedal sensor and provide the output APS signals to the ECM, and that is configured to modify one or more of the output APS signals by changing the indicated position of the accelerator pedal before providing the output APS signals to the ECM, whereby the ISM system limits the speed of the vehicle to an allowed speed that is determined by the ISA system. Furthermore, the ISA system comprises a pedal interface comprising a first signal processing circuit for modifying digital APS signals and a second signal processing circuit for modifying analog APS signals.

In a feature of the invention, each of the first and second signal processing circuits comprises a plurality of inputs each for receiving and processing APS signals and a corresponding number of outputs for providing the APS signals to the ECM, whereby the ISA system is compatible with pedal sensors that output analog APS signals, pedal sensors that output analog APS signals, and pedal sensors that output analog and digital APS signals.

In a feature of the invention, the pedal interface comprising the first and second signal processing circuits is powered by a first power source that also powers the pedal sensor and the ECM, and the ISA system comprises modules that are powered by a second, different power source and an insulation circuit for insulating power provided by the first power source from power provided by the second, different power source.

In a feature of the invention, the ISA system is configured to change a position of the accelerator pedal indicated by an analog APS signal by reducing a voltage of the analog APS signal which voltage corresponds to the position of the accelerator pedal.

In other features, the ISA system preferably comprises a synchronous timer for synchronizing a subtraction signal with the APS signal. Additionally, the extent of the voltage reduction is determined based on the allowed speed determined by the ISA system. In some embodiments, the extent of the determined voltage reduction is lessened based on a detected voltage drop arising from the passing of the APS signal through the ISA system and detection of the voltage drop is repeatedly performed for dynamically compensating for changes in the voltage drop that may occur due to time and temperature.

In a feature of the invention, the ISA system is not configured to increase the voltage of an analog APS signal.

In a feature of the invention, the ISA system is configured to change a position of the accelerator pedal indicated by a digital APS signal by reducing a duty cycle of the digital APS signal which duty cycle corresponds to the position of the accelerator pedal. Preferably, the ISA system is not configured to increase the duty cycle of the digital APS signal. Furthermore, the ISA system may comprise an AND logic gate that is configured to determine whether to provide a modified APS signal or an unmodified version of the APS signal to the ECM when the APS signal is an active-high signal. Alternatively, the ISA system may comprise an OR logic gate that is configured to determine whether to provide a modified APS signal or an unmodified version of the APS signal to the ECM when the APS signal is an active-low signal.

In an aspect of the invention, a vehicle comprises: a pedal with a pedal sensor that is configured to output accelerator pedal sensor (APS) signals, at least one of which indicates a position of the accelerator pedal; an engine control module (ECM) that is configured to effect acceleration of the vehicle at different rates as a function of a position of the accelerator pedal indicated by an APS signal; and an intelligent speed adaptor (ISA) system that is configured to receive APS signals output from the pedal sensor and provide the output APS signals to the ECM, and that is configured to modify one or more of the output APS signals by changing the indicated position of the accelerator pedal before providing the output APS signals to the ECM, whereby the ISM system limits the speed of the vehicle to an allowed speed that is determined by the ISA system. The ISA system is configured to detect whether an APS signal is digital or analog and, based on the detection, apply the APS signal to either the first or second signal processing circuits.

In an aspect of the invention, a vehicle comprises: a pedal with a pedal sensor that is configured to output accelerator pedal sensor (APS) signals, at least one of which indicates a position of the accelerator pedal; an engine control module (ECM) that is configured to effect acceleration of the vehicle at different rates as a function of a position of the accelerator pedal indicated by an APS signal; and an intelligent speed adaptor (ISA) system that is configured to receive APS signals output from the pedal sensor and provide the output APS signals to the ECM, and that is configured to modify one or more of the output APS signals by changing the indicated position of the accelerator pedal before providing the output APS signals to the ECM, whereby the ISM system limits the speed of the vehicle to an allowed speed that is determined by the ISA system. The ISA system is configured to profile ranges of pedal movement between a released accelerator pedal and a fully depressed accelerator pedal.

In an aspect of the invention, a vehicle comprises: a pedal with a pedal sensor that is configured to output accelerator pedal sensor (APS) signals, at least one of which indicates a position of the accelerator pedal; an engine control module (ECM) that is configured to effect acceleration of the vehicle at different rates as a function of a position of the accelerator pedal indicated by an APS signal; and an intelligent speed adaptor (ISA) system that is configured to receive APS signals output from the pedal sensor and provide the output APS signals to the ECM, and that is configured to modify one or more of the output APS signals by changing the indicated position of the accelerator pedal before providing the output APS signals to the ECM, whereby the ISM system limits the speed of the vehicle to an allowed speed that is determined by the ISA system. The ISA system further comprises a signal generator for generating known APS signals as input reference signals, and the ISA system is configured to automatically perform a calibration method by applying the input reference signals to the first and second signal processing circuits and comparing the APS signals resulting therefrom with corresponding known modified APS signals as output reference signals.

In an aspect of the invention, a vehicle comprises: a pedal with a pedal sensor that is configured to output accelerator pedal sensor (APS) signals, at least one of which indicates a position of the accelerator pedal; an engine control module (ECM) that is configured to effect acceleration of the vehicle at different rates as a function of a position of the accelerator pedal indicated by an APS signal; and an intelligent speed adaptor (ISA) system that is configured to receive APS signals output from the pedal sensor and provide the output APS signals to the ECM, and that is configured to modify one or more of the output APS signals by changing the indicated position of the accelerator pedal before providing the output APS signals to the ECM, whereby the ISM system limits the speed of the vehicle to an allowed speed that is determined by the ISA system. A mechanical relay in a default state provides APS signals output from the pedal sensor to the ECM by bypassing a pedal interface of the ISA system.

In a feature, the ISA system is configured to monitor and enter an inactive mode if predetermined vehicle conditions and ISA system conditions are not met.

In an aspect of the invention, an intelligent speed adaptor (ISA) system comprises a pedal interface that is configured to receive accelerator pedal sensor (APS) signals output from a pedal sensor and provide the output APS signals to an engine control module (ECM), and that is configured to modify one or more of the output APS signals by changing an indicated position of the accelerator pedal before providing the output APS signals to the ECM, whereby the ISM system limits the speed of the vehicle to an allowed speed that is determined by the ISA system. The pedal interface comprises a first signal processing circuit for modifying digital APS signals and a second signal processing circuit for modifying analog APS signals.

In a feature, each of the first and second signal processing circuits comprises a plurality of inputs each for receiving and processing APS signals and a corresponding number of outputs for providing the APS signals to the ECM, whereby the ISA system is compatible with pedal sensors that output analog APS signals, pedal sensors that output analog APS signals, and pedal sensors that output analog and digital APS signals.

In a feature, the pedal interface comprising the first and second signal processing circuits is powered by a first power source that also powers a pedal sensor and the ECM, and the ISA system comprises modules that are powered by a second, different power source and an insulation circuit for insulating power provided by the first power source from power provided by the second, different power source.

In a feature, the ISA system is configured to change a position of the accelerator pedal indicated by an analog APS signal by reducing a voltage of the analog APS signal which voltage corresponds to the position of the accelerator pedal. Furthermore, the ISA system preferably comprises a synchronous timer for synchronizing a subtraction signal with the APS signal, and the extent of the voltage reduction is determined based on the allowed speed determined by the ISA system. In some embodiments, the extent of the determined voltage reduction is lessened based on a detected voltage drop arising from the passing of the APS signal through the ISA system and detection of the voltage drop is repeatedly performed for dynamically compensating for changes in the voltage drop that may occur due to time and temperature.

In a feature, the ISA system is not configured to increase the voltage of an analog APS signal.

In a feature, the ISA system is configured to change a position of the accelerator pedal indicated by a digital APS signal by reducing a duty cycle of the digital APS signal which duty cycle corresponds to the position of the accelerator pedal.

In a feature, the ISA system is not configured to increase the duty cycle of a digital APS signal.

In some embodiments, the ISA system comprises an AND logic gate that is configured to determine whether to provide a modified APS signal or an unmodified version of the APS signal to the ECM, and the APS signal is an active-high signal; and in some embodiments the ISA system comprise an OR logic gate that is configured to determine whether to provide a modified APS signal or an unmodified version of the APS signal to the ECM, and the APS signal is an active-low signal.

In an aspect of the invention, an intelligent speed adaptor (ISA) system comprises a pedal interface that is configured to receive accelerator pedal sensor (APS) signals output from a pedal sensor and provide the output APS signals to an engine control module (ECM), and that is configured to modify one or more of the output APS signals by changing an indicated position of the accelerator pedal before providing the output APS signals to the ECM, whereby the ISM system limits the speed of the vehicle to an allowed speed that is determined by the ISA system. The ISA system is configured to profile ranges of pedal movement between a released accelerator pedal and a fully depressed accelerator pedal.

In an aspect of the invention, an intelligent speed adaptor (ISA) system comprises a pedal interface that is configured to receive accelerator pedal sensor (APS) signals output from a pedal sensor and provide the output APS signals to an engine control module (ECM), and that is configured to modify one or more of the output APS signals by changing an indicated position of the accelerator pedal before providing the output APS signals to the ECM, whereby the ISM system limits the speed of the vehicle to an allowed speed that is determined by the ISA system. The ISA system is configured to detect whether an APS signal is digital or analog and, based on the detection, apply the APS signal to either the first or second signal processing circuits.

In an aspect of the invention, an intelligent speed adaptor (ISA) system comprises a pedal interface that is configured to receive accelerator pedal sensor (APS) signals output from a pedal sensor and provide the output APS signals to an engine control module (ECM), and that is configured to modify one or more of the output APS signals by changing an indicated position of the accelerator pedal before providing the output APS signals to the ECM, whereby the ISM system limits the speed of the vehicle to an allowed speed that is determined by the ISA system. The ISA system further comprises a signal generator for generating known APS signals as input reference signals, and the ISA system is configured to automatically perform a calibration method by applying the input reference signals to the first and second signal processing circuits and comparing the APS signals resulting therefrom with corresponding known modified APS signals as output reference signals.

In an aspect of the invention, an intelligent speed adaptor (ISA) system comprises a pedal interface that is configured to receive accelerator pedal sensor (APS) signals output from a pedal sensor and provide the output APS signals to an engine control module (ECM), and that is configured to modify one or more of the output APS signals by changing an indicated position of the accelerator pedal before providing the output APS signals to the ECM, whereby the ISM system limits the speed of the vehicle to an allowed speed that is determined by the ISA system; and a mechanical relay that, in a default state, provides APS signals output from the pedal sensor to the ECM by bypassing the pedal interface of the ISA system.

In an aspect of the invention, an intelligent speed adaptor (ISA) system comprises means rendering the ISA system compatible with different accelerator pedal types.

In an aspect of the invention, an intelligent speed adaptor (ISA) system comprises means for maintaining the time-sensitive ratio between the primary and secondary pedal signals.

In an aspect of the invention, an intelligent speed adaptor (ISA) system comprises means for accommodating the operating range of both primary and secondary pedal signals.

In an aspect of the invention, an intelligent speed adaptor (ISA) system comprises means for increasing signal precision.

In an aspect of the invention, an intelligent speed adaptor (ISA) system comprises a power domain for an accelerator pedal and a power domain for a CAN interface of a vehicle are separate.

In an aspect of the invention, an intelligent speed adaptor (ISA) system comprises means for replicating a signal interface (pull-up vs floating input, open-drain vs push-push output, etc.).

In an aspect of the invention, an intelligent speed adaptor (ISA) system comprises means for maintaining optimal impedance on the vehicle pedal and ECM circuit.

In an aspect of the invention, an intelligent speed adaptor (ISA) system comprises means for automatically detecting and configurating of a pedal interface.

In an aspect of the invention, an intelligent speed adaptor (ISA) system is configured such that the ISA system inherently defaults to a safe pass-through state in an ambiguous, software crash, or unpowered state.

In an aspect of the invention, an intelligent speed adaptor (ISA) system is configured such that the ISA system continuously monitors all signals sent to the ECM to ensure every aspect of the signal is valid and within safe limits and rapid enough (faster than the controlled process reaction time) to revert to pass-through (unmodified pedal signal sent to ECM) in an un-safe detected condition.

In an aspect of the invention, an intelligent speed adaptor (ISA) system separates signal paths using different hardware for multiple signals that are sent.

In an aspect of the invention, an intelligent speed adaptor (ISA) system is installed such that no modification is made of the original ECM safety mechanism.

In an aspect of the invention, an intelligent speed adaptor (ISA) system is configured to only reduce the original APS signal, thereby making it impossible to accelerate more than what the driver is asking.

In an aspect of the invention, an intelligent speed adaptor (ISA) system utilizes only passive/static (non-programable) components in the signal processing circuits for modifying APS signals.

In an aspect of the invention, an intelligent speed adaptor (ISA) system is configured such that an ECM-provided power supply to the pedal is monitored and a reversion to default pass-through is triggered in the event of a supply failure.

In an aspect of the invention, an intelligent speed adaptor (ISA) system is configured such a failure to communicate with the pedal interface for over 200 milliseconds automatically triggers the hardware resetting itself and the system returning to its safe default state.

In an aspect of the invention, an intelligent speed adaptor (ISA) system comprises a continuous watchdog circuit positioned strategically in an isolated pedal interface to supervise the interface with the pedal subsystem.

In an aspect of the invention, an intelligent speed adaptor (ISA) system comprises an embedded signal generator that serves as a constant reference to adjust to sensing drift and error caused by temperature change.

Many aspects and features also are disclosed in the drawings and accompany descriptions below, and in the appendix, incorporated herein by reference. Other aspects and features are disclosed in patent applications of applicant, including: U.S. patent application Ser. No. 18/428,235 and any publication thereof, each which is incorporated herein by reference; U.S. patent application 63/455,541, incorporated herein by reference and from which priority is claimed; and U.S. patent application publications 2012/0215416, 2021/0031765, 2021/0031782, 2021/0061273, and 2021/0387629, each of which is incorporated herein by reference. Additionally, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 1 illustrates a block diagram of a main architecture of a preferred ISA system utilized in a vehicle in accordance with one or more aspects and features of the invention.

FIG. 2a illustrates a primary, acceleration signal of a pair of signals that are provided by an APS, which primary signal is digital and duty cycle (PWM) is utilized to indicate position of an accelerator pedal.

FIG. 2b illustrates a secondary, validation signal of the pair, which secondary signal is digital and is utilized to validate by the ECM the primary signal of FIG. 2a.

FIG. 3a illustrates a primary, acceleration signal of a pair of signals that are provided by another APS, which primary signal is analog and amplitude of the voltage is utilized to indicate position of an accelerator pedal.

FIG. 3b illustrates a secondary, validation signal of the pair of signals, which secondary signal is analog and amplitude of the voltage is utilized to validate by the ECM the primary signal of FIG. 3a.

FIG. 4a illustrates a primary, acceleration signal of a pair of signals that are provided by another APS, which the primary signal is analog and amplitude of the voltage is utilized to indicate position of an accelerator pedal, similar to the signal of FIG. 3a.

FIG. 4b illustrates a secondary, validation signal of the pair of signals, which secondary signal is digital and is utilized to validate by the ECM the primary signal of FIG. 4a.

FIG. 6b illustrates additional steps of the method of FIG. 6a.

FIG. 7 illustrates a table providing a summary of two operation modes of a preferred ISA system.

9

Figures 14, 15, 16:
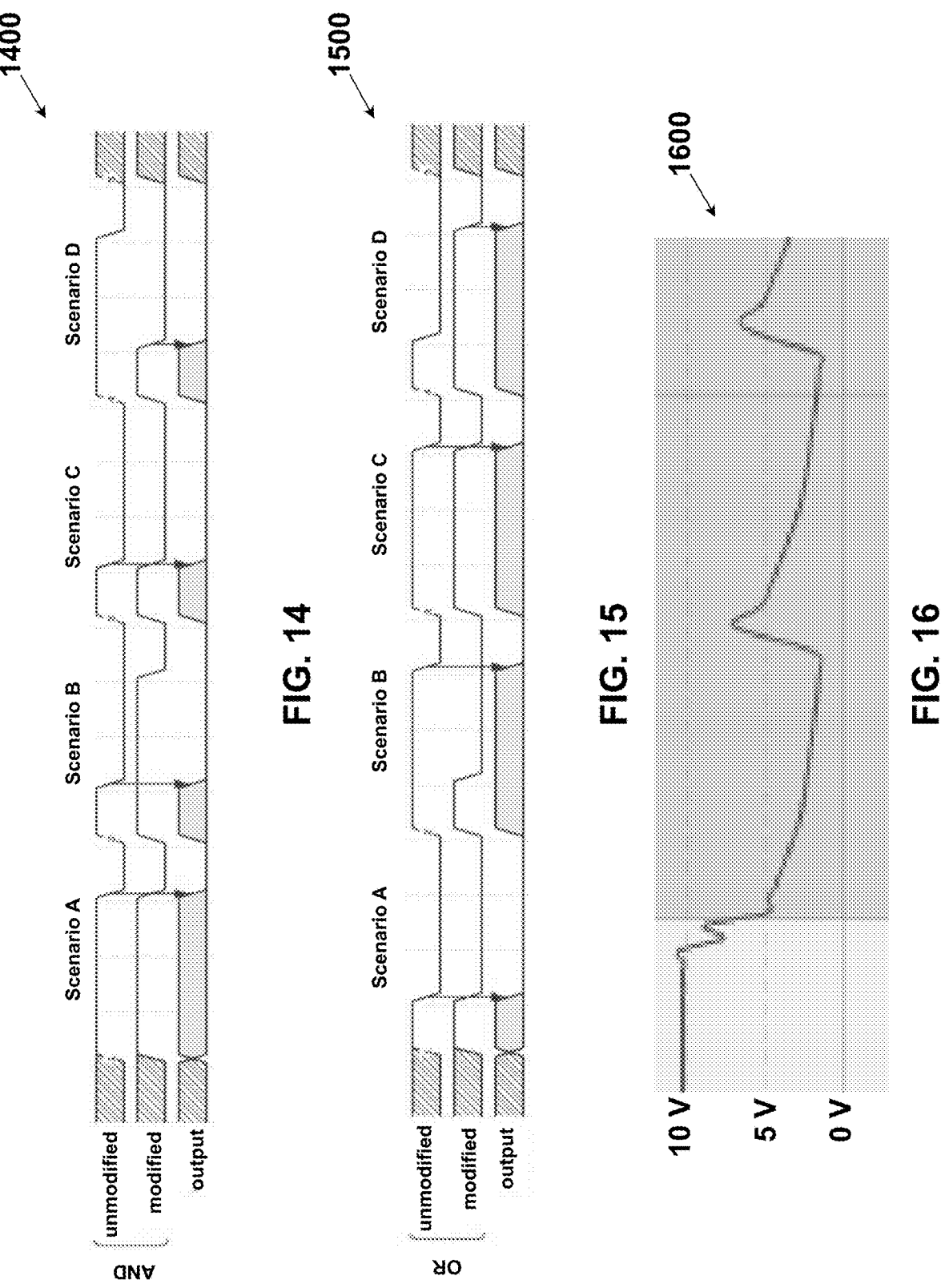

FIG. 14 illustrates a graph of the output of a preferred "AND" logic gate used in connection with active-high digital APS signals.

FIG. 15 illustrates a graph of the output of a preferred "OR" logic gate used in connection with active-low digital APS signals.

FIG. 16 illustrates an example of a pedal power supply failure, wherein the voltage is shown to drop and vary below a static ten volts that was previously being maintained.

DETAILED DESCRIPTION

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112 (f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

In addition, the following terms are also defined for purposes of the present application.

"Active ISA System" and a "closed ISA system" as used herein each means to an ISA system that actively prevents speeding by limiting the speed automatically, overriding a driver's actions causing the speeding, such as by altering acceleration control signals that are sent from an accelerator pedal to an ECM.

"Advisory ISA System" as used herein means an ISA System that warns or alerts a driver when a speed limit is exceeded. The alert may be visual or auditory. Such a system is passive because it does not actively prevent speeding.

"APS" or "APPS" as used herein means the electro-mechanical system that reports the position of the accelerator pedal on a vehicle equipped with drive-by-wire technology, which replaced the mechanical cable that was conventionally used to operate the throttle to control the rate of acceleration of human-operated cars, trucks, etc. APS is an acronym for "accelerator pedal sensor" and APPS is an acronym for "accelerator pedal position sensor".

"Calibration" or "zeroing" as used herein means improving the precision of measured and controlled electronic signals by applying a specific and precise voltage as stimuli and using measurements as a baseline to compensate for precision errors in electrical components.

"Check engine" or "fault" as used herein means an event causing the check engine light or malfunction indicator lamp (MIL) to turn on, indicating to a driver that the vehicle requires maintenance due to a possible defect with one or many of the vehicle's subsystems.

"ECM" or "ECU" as used herein means an engine control module or engine control unit and are used interchangeably herein to generally refer to the electrical modules that control the functionality of a vehicle including engine ignition timing, climate control, alarm system, etc.

"GNS" as used herein means "global navigation satellite system" and refers to satellite navigation, which uses a satellite system to identify a location of a receiving device. GPS, Glonass, and Galileo are examples of global navigation satellite systems.

"IMU" as used herein means inertial measurement unit and refers to the technology enabling the measurement of linear and angular acceleration as well as magnetic orientation of a device. It is used to improve the precision of satellite-based geolocation.

"IoT" as used herein means "internet of things" and is used to describe physical devices that are connected to the Internet.

"ISA system" as used herein means an intelligent speed adaptation system utilized in a vehicle to void or minimize a vehicle's speed from exceeding a specified speed limit. An ISA System may be active or passive.

"IVS" as used herein means "idle validation switch" and refers to a feature of some accelerator pedal sensors used indicate to an ECM that an accelerator pedal is released. The IVS is a single Boolean value that indicates whether an accelerator pedal is either depressed ("1") or released ("0").

"LTE" as used herein means a cellular communication standard used by a mobile device for broadband connection to the Internet.

As used herein apart from an "ECM", a "module" means an arrangement of hardware and/or software that performs one or more specified functions. When the module includes software, the module further preferably comprises a non-transitory machine readable medium in which the software is stored and a computer processing unit of a controller or a microcontroller, or an equivalent thereof, for executing the software. Such machine-readable medium may comprise flash memory, the software may be firmware or middleware, and the software may be capable of being updated through "over the air" or "OTA" updates.

"PWM" is an acronym for "pulse width modulation" and as used herein refers to a method of alternating an electrical signal between two voltages to control or communicate electronically. The duration of time of both voltages is referred to as the period; the number of periods over time is referred to as the frequency and is the reciprocal of the period; and the percentage of time in which one of the voltages is present during a period is referred to as the duty cycle.

One or more preferred embodiments of the invention are next described. The following description of one or more preferred embodiments is merely exemplary in nature and is in no way intended to limit the invention, its implementations, or uses.

Main Architecture of a Preferred System

Figure 1:
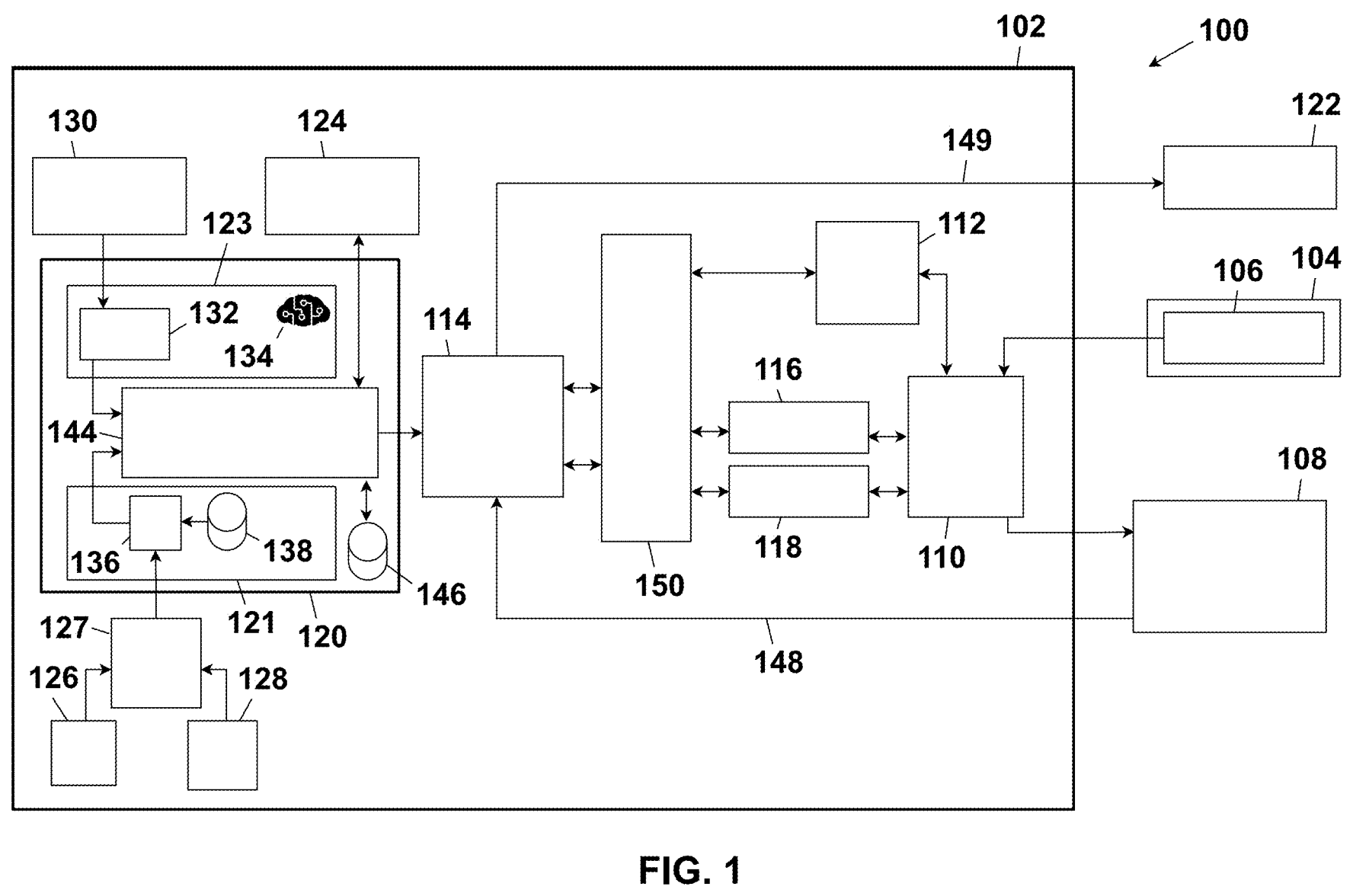

FIG. 1 illustrates a block diagram of a main architecture of a preferred ISA system 100 utilized in a vehicle. As shown in FIG. 1, the vehicle includes an ISA system 102; an accelerator pedal 104 including an accelerator pedal sensor (APS) 106; and an ECM 108.

The APS 106 is configured to provide acceleration signals for indicating to the ECM 108 positions of the accelerator pedal 104 and the ECM is configured to control vehicle acceleration based on the acceleration signals.

As shown in FIG. 1, a mechanical relay 110 of the ISA system 102 is connected in series between the APS 106 and the ECM 108 such that the acceleration signals provided by the APS 106 are routed to the mechanical relay 110. In a default state of the mechanical relay 110, the acceleration signals provided by the APS 106 simply pass through the mechanical relay 110 to the ECM 108 as if the mechanical relay 110 were not there, and the ISA system 102 is essentially bypassed by the acceleration signals provided by the APS 106 and received by the ECM 108. In contrast, in an active state of the ISA system 102, the mechanical relay 110 redirects the acceleration signals from the APS 106 for modification of the acceleration signals if needed to be performed by the ISA system 102 in order to avoid or at least minimize speeding of the vehicle.

Since the mechanical relay 110 of the ISA system 102 is located in series between the APS 106 and the ECM 108, the ISA system 102 essentially intercepts the signals coming from the APS 106 and modulates them before reaching the ECM 108. This enables the ISA system 102 to reduce acceleration and keep the vehicle's speed under the targeted allowed speed limit. Preferably, as the vehicle's speed gets closer to the allowed speed limit, the ISA system 102 progressively reduces the indicated pedal position to the ECM 108 by the acceleration signals, simulating a driver letting up on the accelerator pedal. Once the vehicle speed reaches the target allowed speed limit, the acceleration signals are maintained at the required position to keep that constant speed. Furthermore, the modulation of the signals by the ISA system 102 preferably is only ever a reduction in the indicated accelerator pedal position and never an increase in the indicated accelerator pedal position. The ISA system 102 is configured such that it cannot increase the indicated position of the accelerator pedal position.

The switching of the states of the mechanical relay 110 is effected by a "safety supervisor" module 112. The safety supervisor 112 switches states of the mechanical relay 110 based on communications from a pedal control module 114 of the ISA system 102. Additionally, as a safety precaution, the module 112 is configured to switch the mechanical relay 110 to its default state if active upon a detection of, for example, an error condition or a loss of power to the pedal occurs. Furthermore, the mechanical relay 110 preferably is configured to enter and remain in its default state upon a loss of power to the mechanical relay 110.

In accordance with one or more aspects and features of the invention, the pedal control module 114 detects the pedal signal types of the incoming acceleration signals that are used in each implementation. In particular, the APS 106 may provide two analog signals, an analog and a digital signal, or two digital signals. In order to achieve compatibility with a wide variety of different vehicles and, in particular, vehicles with different accelerator position sensors, the ISA system 102 comprises both an analog signal processing circuit 116 for analog APS signals and a digital signal processing circuit 118 for digital APS signals, and the pedal control module 114 determines the types of signals in use by using these circuits 116,118. Once the signal types are determined, modifications of the APS signals by the pedal control module 114 can be performed using the appropriate signal processing circuit 116,118 for each APS signal.

Modifications are implemented by the pedal control module 114 based on current vehicle speed and an allowed speed limit. The pedal control module 114 is configured to acquire vehicle-related information such as the current vehicle speed, cruise control information, engine RPM, and fuel information by monitoring communications over a controller area network (CAN) of the vehicle through an interface with a data bus of the CAN, which interface is represented by 148. An allowed speed limit is determined and provided to the pedal control module 114 by a speed limit control module 120 of the ISA system 102.

The speed limit control module 120 of the ISA system 102 determines an applicable allowed speed limit for the vehicle based on multiple considerations, which determined applicable allowed speed limit is utilized by the pedal control module 114 in determining whether modification of the acceleration signals provided by the APS 106 are appropriate. In making a determination regarding an applicable allowed speed limit, the speed limit control module 120 relies on both a location analytics module 121 and a vision analytics module 123.

The location analytics module 121 utilizes multiple sensors connected thereto, including a GNSS module 126 and an IMU module 128 and in combination with a location control module 127 determines a current location of the vehicle. The location analytics module 121 includes a map-matching module 136 and a map database 138 which together are used to determine a currently posted speed limit, driving road segment type, and speed zone if any based on location data received from the location control module 127. The location analytics module 121 also preferably uses instantaneous location or a series of locations representing trajectory of the vehicle for calculating location of the vehicle, especially when GNSS data may be temporarily unavailable.

The vision analytics module 123 of the speed limit control module 120 utilizes a camera module 130 for acquisition of image data regarding the environment and conditions in which the vehicle is driving. The vision analytics module includes an image data processing module 132 and deep neural networks 134. The image data processing module 132 preferably uses camera image feeds to perform image recognition leveraging the deep neural networks 134 to recognize and perform multiple vision tasks, such as object detection, image segmentation, and image classification. A vision pipeline allows combining the outputs of those networks in real-time to perform downstream tasks such as speed limit sign tracking, road work zone identification, and hazardous road condition detection (rain, snow, ice). The same pipeline could be adapted to detect and track any other objects such as, for instance, vehicle and pedestrian tracking.

Optionally, the vision system takes as an input the estimated location from the location control module and performs a 3D reconstruction of the scene using multi-view geometry, which would output for instance the location of a speed limit sign or road work zone relative to both the car and the world.

It will thus be appreciated that the vision analytics module 123 determines information regarding a current driving environment of the vehicle, which information may include determination of a currently posted speed limit that has been seen, a driving road segment type that has been seen, and a speed zone that has been seen.

The speed limit control module 120 also comprises a fusion module 144 that determines a current driving context based on determinations from the location analytics module 121 and the vision analytics module. The "fusion" of information from both of these modules 121,123 is believed to result in a more accurate determination of the actual current driving context. Both modules 121,123 are not always accurate, and the relative accuracy of each source will depend on individual use cases. Based on the determination of the actual current driving context, the fusion module 144 then determines an allowed (safe) speed limit to apply to the vehicle at that time in accordance with user-configured rules stored in a database 146. Furthermore, the fusion module 144 is designed to always be fail-safe whenever there is insufficient information to make an accurate determination of the actual current driving context, assuming that the driving context is the one that results in identification of the lowest allowed (safe) speed limit to be implemented for the possible driving contexts that could apply, all as disclosed and taught in one or more of the incorporated references.

The speed limit control module 120 and modules and databases associated therewith are preferably configured to receive cloud communications and perform over-the-air (OTA) updates and effect configuration changes through access to a cellular network via a communications module 124. For example, the map data of the database 138 preferably is updated on a regular basis.

In order to avoid possible interference in limiting the speed of the vehicle when the vehicle includes cruise control, the pedal control module 114 preferably is configured to disengage cruise control through an interface represented at 149 to a brake switch simulating control module 122 that is arranged in parallel with a brake switch circuit, as disclosed and taught in one or more of the incorporated references.

In the context of the foregoing architecture, different aspects and features of the invention will now be described.

Aspects and Features: User Centricity

In furtherance of the object of achieving widespread adoption of the ISA system, and in accordance with one or more aspects and features of the invention, users are provided with options for configuring speed profiles to be used in different driving contexts. Users are able to configure speed profiles assigned to different driving contexts through a web portal. Such user customization promotes user centricity of preferred ISA systems. For example, in normal driving conditions on dry roads, users can select a speed profile that is different from a speed profile for a driving context such as snow, as detected by the system. Once the selection is done, speed profile configurations are propagated to the ISA system of each vehicle in a user's fleet via wireless communications preferably using a cellular data network for storing in the database 146. The speed profiles set the allowed (safe) speed limits for the various driving contexts.

Aspects and Features: Compatibility

In furtherance of the object of achieving widespread adoption of the ISA system, one or more aspects and features of the invention relating primarily to compatibility of pre-
ferred ISA systems are now described. In particular, in order
to ensure compatibility with many of the different types of
accelerator position sensor, preferred embodiments: (1)
maintain a time-sensitive ratio between the primary and
secondary signals from the APS; (2) accommodate the
operating range of both primary and secondary signals from
the APS; (3) utilize runtime dynamic compensation to
increase signal precision; (4) provide separate power
domains for the pedal and for the CAN interface; (5)
replicate signal interface (pull-up vs floating input, open-
drain vs push-push output, etc.); (6) ensure optimal imped-
ance on the vehicle pedal and ECM circuit; and (7) provide
automatic detection of the APS signal types and self-con-
figuration of the pedal interface.

As a preliminary matter, it should first be noted that with
respect to accelerator position sensors, most current accel-
eration position sensors each transmits acceleration infor-
mation to the ECM utilizing two different signals: a first
serves as a primary signal and communicates the desired
acceleration and a second serves as a signal for validating
the primary signal. The validation signal is typically a
smaller representation of the primary signal, but in some
instances, the validation signal is simply a signal indicating
whether the accelerator pedal is depressed. These signals
will now be described with regard to the different types of
signals that are provided by various different accelerator
pedal sensors.

APS Digital Signals

Figures 2A, 2B, 3A, 3B:
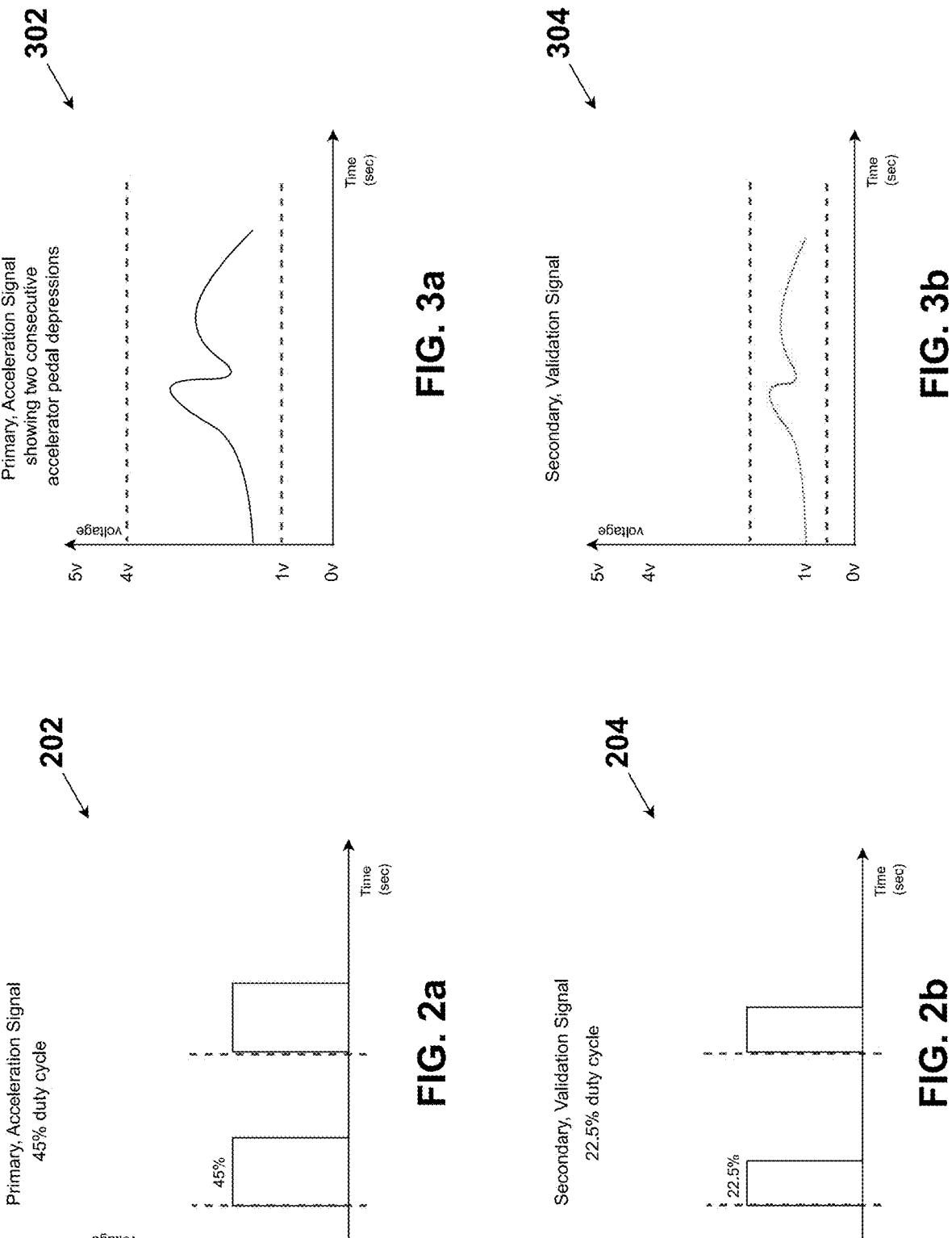

Some accelerator pedal sensors provide a pair of digital
signals: an acceleration digital signal and a safety digital
signal, each with a varying duty cycle (PWM). Two such
signals are illustrated in FIGS. 2a and 2b. FIG. 2a illustrates
a primary, acceleration signal of a pair of signals that are
provided by an APS, which primary signal is digital and duty
cycle (PWM) is utilized to indicate position of an accelerator
pedal. FIG. 2b illustrates a secondary, validation signal of
the pair, which secondary signal is digital and is utilized to
validate by the ECM the primary signal of FIG. 2a. In
particular, a primary, acceleration signal is represented in
graph 202 of FIG. 2a, and a corresponding secondary,
validation signal is represented in graph 204 of FIG. 2b.

The exact PWM duty range for a given pedal position
varies with vendor, model, and year, but the operating
frequency is typically 200 Hz. That frequency fluctuates
over time (±10 Hz) and is independent for each signal, i.e.,
the two signals may be unaligned or out of phase. Further-
more, digital pedal PWM operates within a set range and
never reaches static signal voltage, i.e., never reaches 0% or
100% duty cycle. The set range may be, e.g., from 15% to
70% duty cycle with 20% representing no depression of the
accelerator pedal and 70% representing full depression of
the accelerator pedal. Validation is performed by comparing
the duty cycle of the primary signal with that of the
validation signal. For example, if the accelerator pedal is at
50% of its motion range, the primary signal may have a duty
cycle of 45% as shown in graph 202 while the validation
signal may have a duty cycle of 22.5% as shown in graph
204. The primary signal is validated by confirming that the
duty cycle is twice that of the validation signal and is used
by the ECM to ensure the primary signal is not corrupted
prior to implementing acceleration of the vehicle corre-
sponding to the indicated position of the pedal. Furthermore,
the duty cycles also remain constant for a given fixed position of the accelerator pedal, i.e., the signals have static
pulse widths for a given accelerator pedal position.

APS Analog Signals

A pair of analog signals that are provided by an APS are
illustrated in FIGS. 3a and 3b. In particular, a primary,
acceleration signal is represented in graph 302 of FIG. 3a.
The amplitude of the voltage of the signal varies over time
and is used to indicate the position of the accelerator pedal
over time. As illustrated, two separate depressions of the
accelerator pedal are indicated by the signal shown in the
graph 302 of FIG. 3a. A secondary, validation signal corre-
sponding to the primary signal of FIG. 3a is represented in
graph 304 of FIG. 3b. The amplitude of the voltage of the
secondary signal varies over time and is used to validate by
the ECM the primary signal of FIG. 3a. Moreover, these
signals indicate two consecutive accelerations.

Analog APS signals typically operate within the range of
300 mv to 4700 mv (depending on vendor, model, and year)
but never reach 0 mv (ground) or 5000 mv (typical supply).
For example, if the accelerator pedal is at 50% of its motion
range, the primary signal may have a voltage of 2200
millivolts while the second signal may have 1100 millivolts.
The amplitude of the voltage of this secondary signal serves
as validation of the primary signal and is used by the ECM
to ensure the primary signal is not corrupted prior to
implementing acceleration of the vehicle corresponding to
the indicated position of the pedal. Furthermore, the voltage
amplitude remains constant (static) for a given fixed position
of the accelerator pedal.

APS Analog and Digital Signals

Figures 4A, 4B:
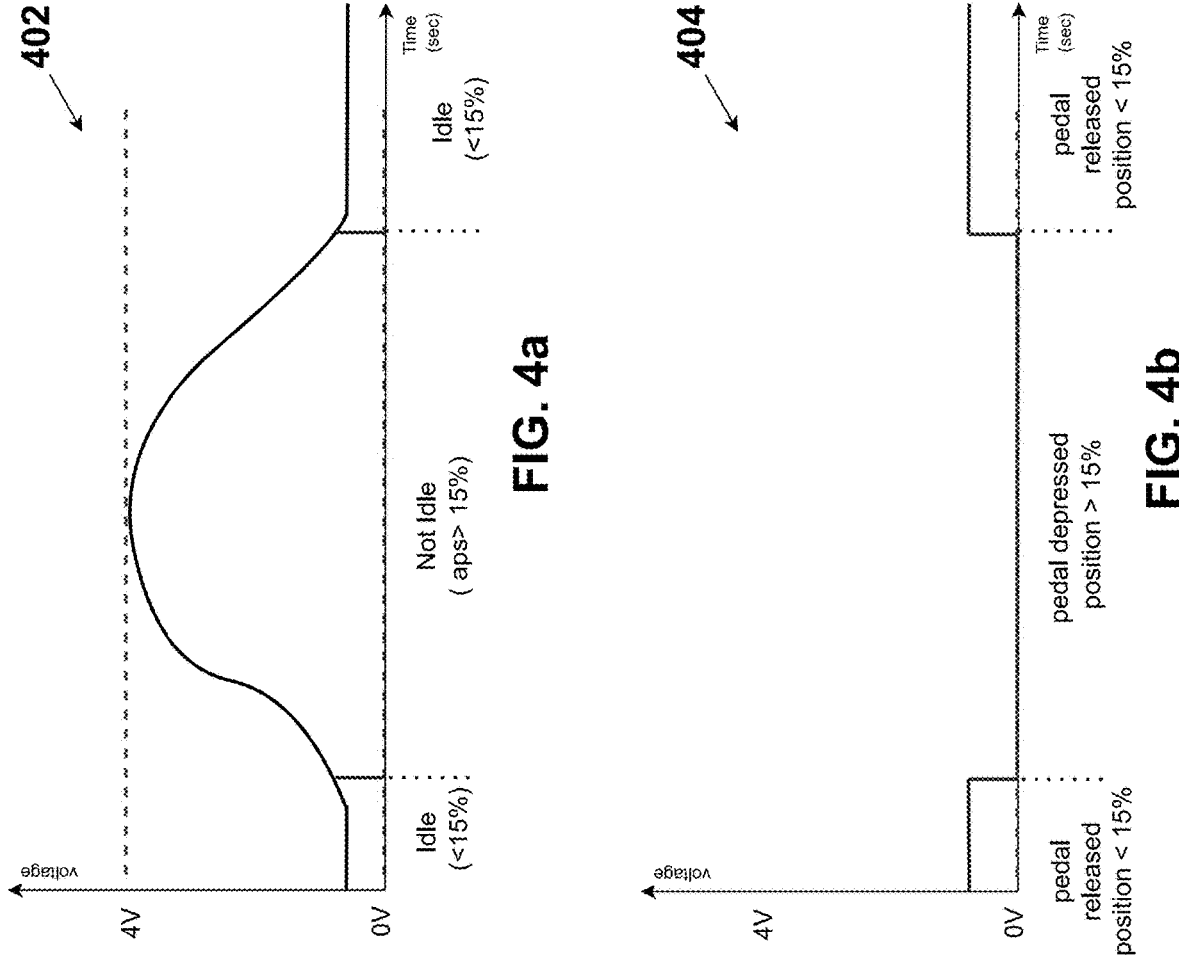

FIG. 4a illustrates a primary, acceleration signal of a pair
of signals that are provided by another APS, which the
primary signal is analog and amplitude of the voltage is
utilized to indicate position of an accelerator pedal, similar
to the signal of FIG. 3a. In contrast, FIG. 4b illustrates a
secondary, validation signal of the pair of signals, which
secondary signal is digital and is utilized to validate by the
ECM the primary signal of FIG. 4a.

In particular, FIG. 4a illustrates acceleration over time
using an analog acceleration signal in graph 402, and FIG.
4b illustrates in graph 404 a corresponding digital validation
signal that is provided by an idle validation switch (IVS).
The analog acceleration signal uses a single analog voltage
to indicate an accelerator pedal's position; however, the IVS
is an electromechanical switch which is triggered to provide
a signal to simply indicate that the accelerator pedal is
depressed beyond a threshold. The ECM uses the IVS signal
to validate when the pedal is released corresponding to
engine idling or is depressed.

For example, the threshold may be 15% of the range of
movement of the accelerator pedal. When the pedal position
is less than the threshold of 15% (pedal position<15%), the
IVS signal is shorted to its high value indicating no accel-
eration for an idle state of the engine; once the pedal position
is over the threshold of 15% (pedal position>15%), the
signal is shorted to ground indicating acceleration. If the
voltage amplitude of the primary signal of FIG. 4a indicates
depression of the pedal for acceleration and the secondary
signal indicates acceleration, then the ECM implements the
acceleration corresponding to the pedal position indicated by
the primary signal. If the secondary signal indicates that the acceleration pedal is released, then no ECM does not implement any acceleration indicated by the primary signal.

Maintaining Time-Sensitive Ratio Between Primary and Secondary APS Signals

With respect to the time-sensitive ratio between both primary and secondary signals, first, at the hardware level, a dedicated digital signal processing circuit is provided in the ISA system for modification of digital APS signals, and a dedicated analog signal processing circuit is provided in the ISA system for modification of analog APS signals. Preferably, each of the analog and digital signal processing circuits accommodates at least two APS signal input lines and has at least two modified APS signal output lines. This approach allows each type of APS signal to be modified while respecting the various signal modification requirements for the types and ranges of APS signals available on the automotive market, thereby addressing problems found in prior ISA systems arising from the lack of APS signal standardization in the industry.

Utilizing Runtime Dynamic Compensation to Reduce Relative Error

APS signal characteristics are monitored to ensure they remain within operational boundaries. Such characteristics may comprise the ratios between primary and secondary signals and the timing and voltage amplitudes. Preferably the original ratio between the primary and secondary APS signals provided by the accelerator pedal sensor is preserved with respect to modified APS signals with less than a 5% relative error at all times. It has been found that a relative error of +/−5% is acceptable, but otherwise, the ECM will indicate a fault.

Figure 5:
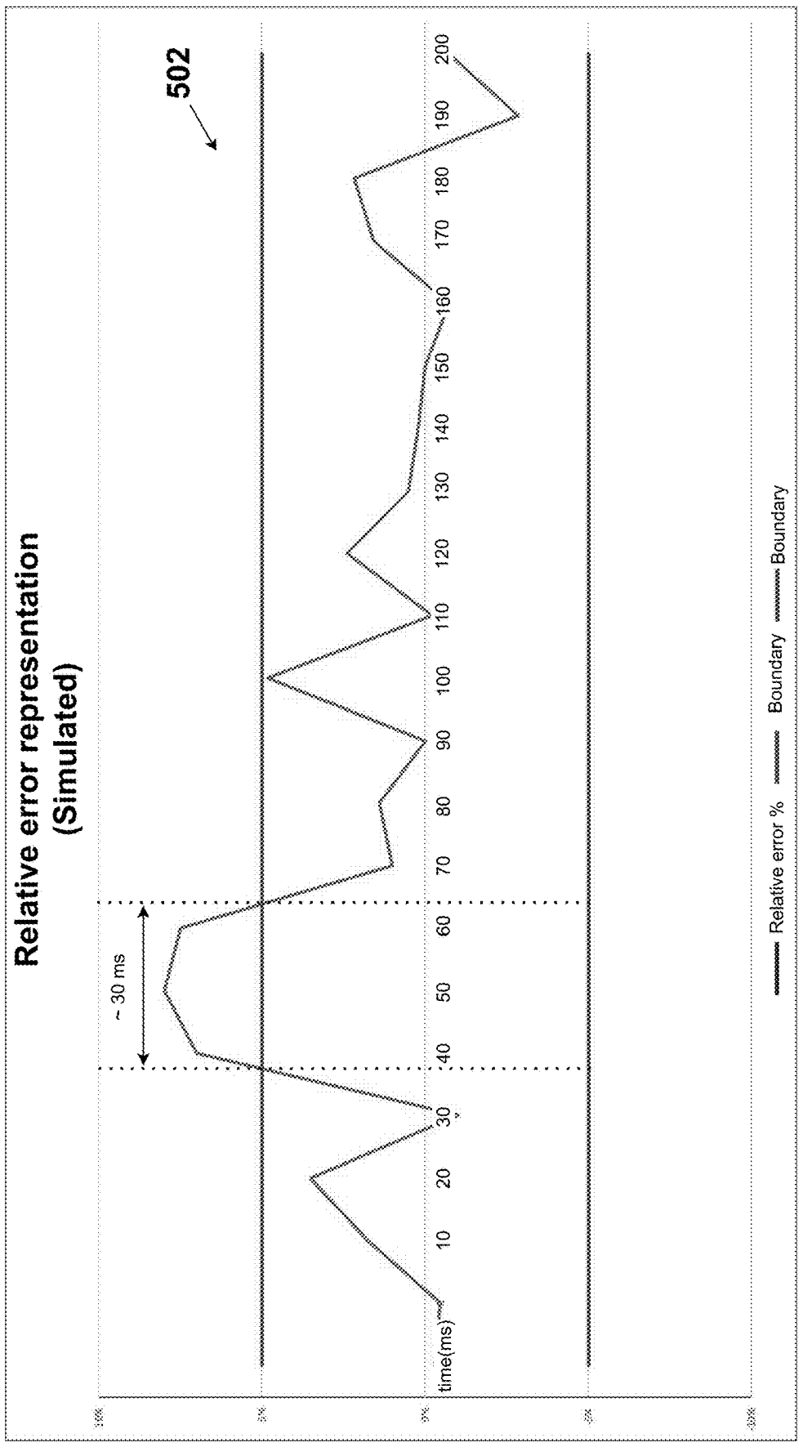
FIG. 5 illustrates a graph of relative error, with approximately 30 milliseconds non-compliance being shown as an example.

More particularly, when the relative error expressed as a percentage difference between the primary and secondary signals exceeds 5% for over 100-200 milliseconds, a fault is raised (check engine triggered). This relative error is derived by subtracting the relative position of the primary signal from the secondary signal. That is, if the primary signal is at 34% of its operating range and the secondary signal is at 30% of its operating range, then there is a relative error of 4%. The graph 502 of FIG. 5 illustrates a simulated representation of relative error, with approximately 30 milliseconds non-compliance.

Accordingly, the margin of error is monitored and the ISA system is deactivated preferably by the safety supervisor module if a margin of error meets or exceeds +/−5%. In order to avoid deactivation, dynamic compensation is utilized. In this regard, dynamic compensation refers to the lessening of the modification being performed by the signal processing circuits, i.e., that which is being taken away is lessened. With regard to analog APS signals, a voltage reduction being made to one or more analog signals by the analog signal processing circuit may be lessened in order to reduce the relative error.

Providing Separate Power Domains for Pedal and for the CAN Interface

Preferably, a separate power domain is implemented for the pedal interface, with its own isolated ground and power supply. Many truck OEMs use different power domains in their vehicle and to comply with this requirement, the pedal interface uses isolation circuitry 150 (FIG. 1) to ensure that the ECM ground does not contact the ground of the pedal interface, e.g., chassis ground. The isolation circuit is schematically located between the pedal control module 114 in one domain and the safety supervisor module 112 and the pedal circuits 116,118 in another domain which preferably includes the pedal and pedal sensor as well as the ECM.

Replicating Signal Interface (Pull-Up vs Floating Input, Open-Drain vs Push-Push Output, Etc.)

To increase compatibility, the digital interface is enabled to act as an open-drain pedal or as a totem-pole signal output, enabling the system to mimic with precision the behavior of the original pedal sensor.

Ensuring Optimal Impedance on the Vehicle Pedal and ECM Circuit

For compatibility, a high-impedance input and low-impedance output is used to replicate the vehicle ecosystem and act seamlessly on both fronts (pedal and ECM).

Providing Automatic Detection of the APS Signal Types and Self-Configuration of the Pedal Interface An initialization method 600 for the automatic detection of APS signal types and self-configuration of a pedal interface preferable is performed, which method preferably is used during installation or resetting of a preferred ISA system. The method is used to detect a pedal type and, specifically, the APS signal types that are provided by the particular pedal. The method also detects the range of operation of the pedal for determining the pedal position indicated by the APS primary signal. The method is performed using information provided by the ECM over the CAN and by reading the APS signals corresponding to release and full depression of the pedal.

Figure 6A:
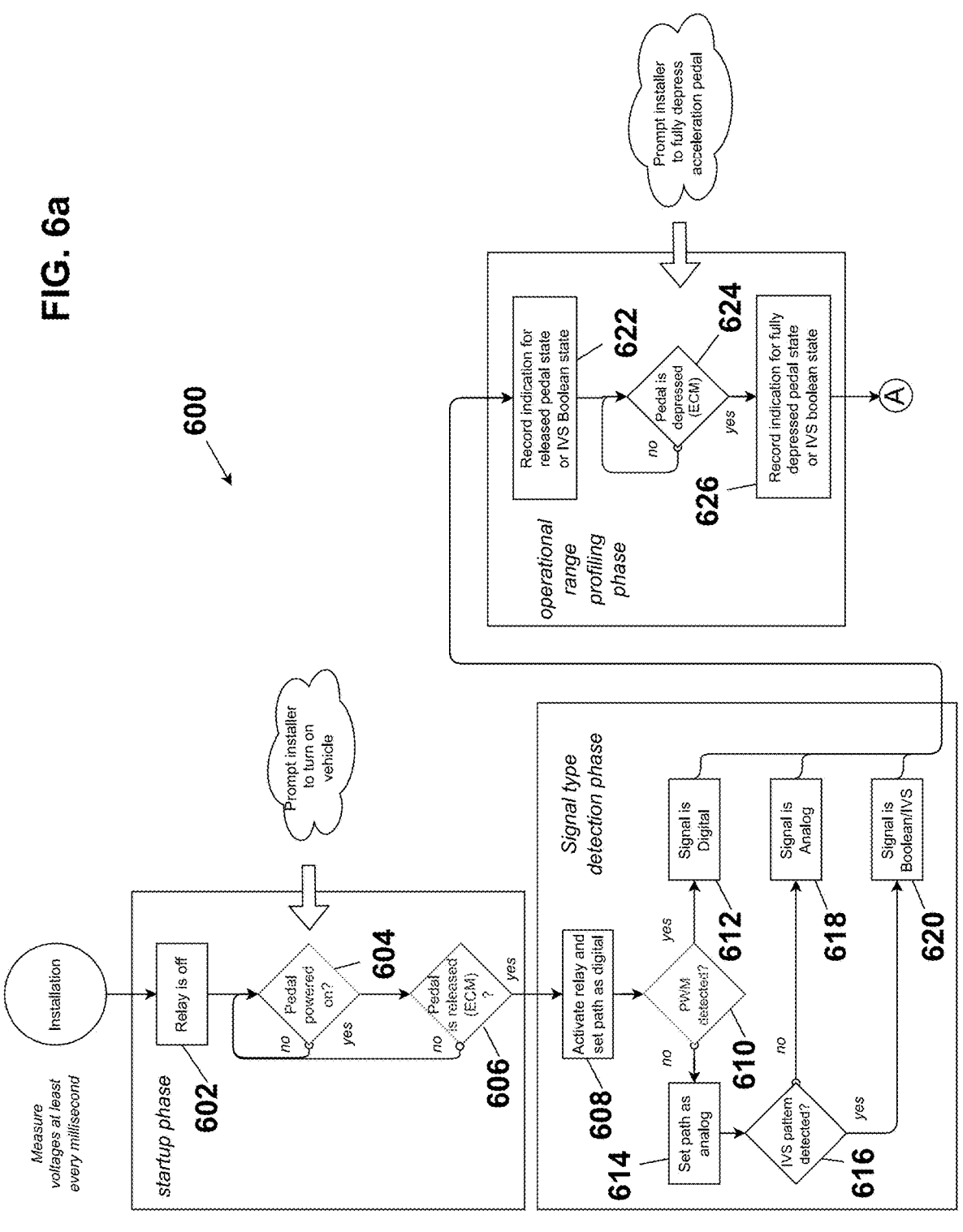
FIG. 6a illustrates steps of an initialization method of a preferred ISA system in which the automatic detection of APS signal types and self-configuration of a pedal interface are performed.
Figure 6B:
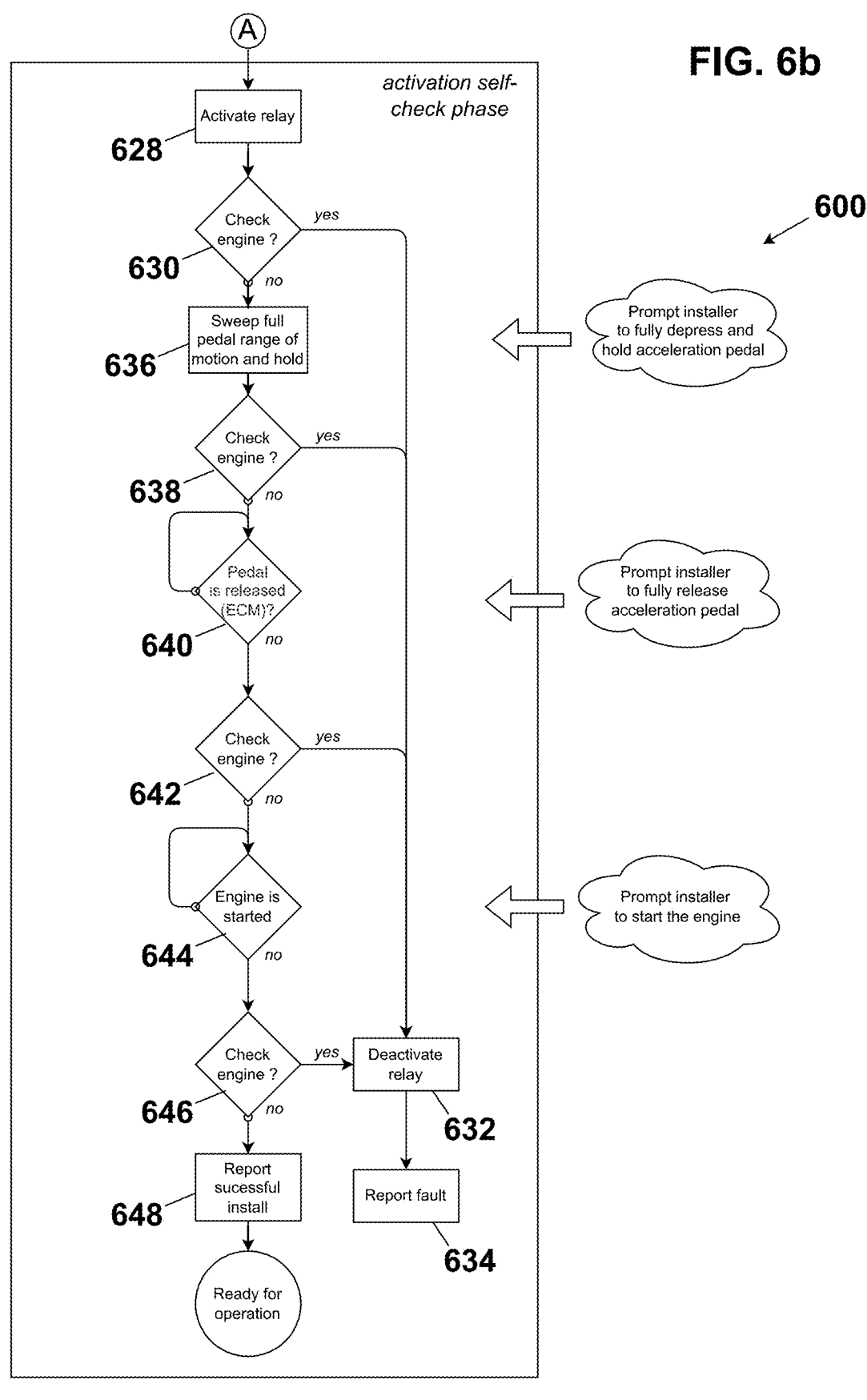

In particular, FIGS. 6a and 6b illustrate the steps of the method 600 as it is preferably performed. The steps of the method 600 begin in a startup phase with the mechanical relay in the default bypass state (step 602) and the vehicle and specifically the pedal being powered on. This is reported by communications with the ECM, and the method pauses in step 606 until the EMC reports that the pedal is in a released state. Both conditions must be met before entering the next phase.

The next phase is a signal type detection phase, in which the primary and secondary signals from the accelerator position sensor are detected. The following description generally applies to the detection for each signal.

First, a digital APS signal is presumed. The relay is activated and the path is set for providing the APS signal to the digital signal processing circuit of the ISA system (step 608). Detection of a PWM signal is then performed (step 610). If the PWM detection is successful then the signal is identified as being digital (step 612) and the next phase of operational range profiling is then entered.

If the PWM detection is unsuccessful, then the signal type is treated as being analog (step 614) and the signal is directed to the analog signal processing circuit. Detection of an IVS pattern is performed (step 616). If an IVS pattern is not detected, then the signal is determined to be analog (step 618); else the signal is determined to be Boolean and representative of the secondary signal provided from an IVS (step 620). The next phase of operational range profiling is then entered.

In the operational range profiling phase, values indicating pedal position are discovered and recorded. Specifically, a profile is recorded for upper and lower bounds indicative of a released state of the pedal and a fully depressed state of the pedal, with a linear correspondence between the bounds and the pedal positions being established.

First, a profile for the signal is established in step 622 by recording a measured value of the duty cycle of the signal as being a boundary for a range of duty cycle values which boundary value indicates the released pedal state, provided the determination in step 610 is in the affirmative. Alternatively, if the determination in step 616 is in the affirmative, then a measured value of the voltage of the signal is recorded as being the Boolean value of the IVS signal indicating the released pedal state; and if the determination in step 616 is not in the affirmative, then a measured value of the voltage of the signal is recorded as being a boundary for a volage range which boundary value indicates the released pedal state.

Next, the other boundary value is determined by first determining in step 624 through communications with the ECM that the pedal now is a fully depressed state opposite to the prior released state. This is reported by communications with the ECM, and the method pauses in step 624 until the EMC reports that the pedal is in a released state.

Upon an affirmative determination at step 624, the value of the signal indicative of the pedal being in the fully depressed state is measured and recorded in step 626. This is done by recording a measured value of the duty cycle of the signal as being a boundary for the range of duty cycle values which boundary value indicates the fully depressed pedal state, provided the determination in step 610 is in the affirmative. Alternatively, if the determination in step 616 is in the affirmative, then a measured value of the voltage of the signal is recorded as being the Boolean value of the IVS signal simply indicating the depressed pedal state; and if the determination in step 616 is not in the affirmative, then a measured value of the voltage of the signal is recorded as being a boundary for a volage range which boundary value indicates the fully depressed pedal state.

With respect to profiling a digital APS signal, the boundary value recorded in step 622 is deemed for that respective signal to be the 0% position of the full range of movement of the pedal between the released state and the fully depressed state, and the boundary value that is recorded in step 626 is deemed for that respective signal to be the 100% position of the full range of movement of the pedal between the releases state and the fully depressed state. A linear correspondence is then established by the boundary values and the pedal positions for that signal.

With respect to profiling an analog APS signal that is not provided by an IVS, the boundary value that is recorded in step 622 for the voltage is deemed for that respective signal to be the 0% position of the full range of movement of the pedal between the released state and the fully depressed state, and the value that is recorded in step 626 for the voltage is deemed for that respective signal to be the 100% position of the full range of movement of the pedal between the releases state and the fully depressed state. A linear correspondence is then established by the boundary values and the pedal positions for that signal.

Following profiling of the operational ranges of the APS signals, the next phase that is entered in the method 600 is the activation self-check phase, shown in FIG. 6*b*.

In the activation self-check phase, the mechanical relay is activated (step 628) and a determination is made whether there is a check engine or fault indicated by the ECM (step 630). If determination is affirmative, then the relay is deactivated (step 632), and a fault notification is provided to the user/fleet manager (step 634).

If the determination in step 630 is negative, then the pedal is fully depressed from the releases state for sweeping the full pedal range of motion in step 636 and the pedal is held in the fully depressed state.

A determination is then made whether there is a check engine or fault indicated by the ECM (step 638). If determination is affirmative, then the relay is deactivated (step 632), and a fault notification is provided to the user/fleet manager (step 634).

If the determination in step 638 is negative, then the pedal is released. This is reported by communications with the ECM, and the method pauses in step 640 until the EMC reports that the pedal is in a released state.

A determination is then made whether there is a check engine or fault indicated by the ECM (step 642). If determination is affirmative, then the relay is deactivated (step 632), and a fault notification is provided to the user/fleet manager (step 634).

If the determination in step 642 is negative, then the vehicle engine is started. This is reported by communications with the ECM, and the method pauses in step 644 until the EMC reports that the engine is started.

A determination is then made whether there is a check engine or fault indicated by the ECM (step 646). If determination is affirmative, then the relay is deactivated (step 632), and a fault notification is provided to the user/fleet manager (step 634).

If the determination in step 646 is negative, then the installation is reported as successful (step 648) and the ISA system is ready for operation.

Aspects and Features: Safety

In order to achieve safety, preferred embodiments in accordance with aspects and features of the invention implemented the following: (1) the ISA system/mechanical relay is configured to default to the pass-through state in an ambiguous or unpowered state, or following a software crash; (2) there is continuous monitoring of all signals sent to the ECM to ensure every aspect of the signal is valid and within safe limits and rapid enough (faster than the controlled process reaction time) to revert to pass-through (unmodified pedal signal sent to ECM) if an un-safe condition is detected condition; (3) separate signal paths are provided using different hardware for the multiple signals sent, reducing probability of chained failure; (4) no modification is made of the original ECM safety mechanisms, keeping them reliable and ensuring the ECM can take the appropriate decision to ensure vehicle safety; (5) architecture is utilized that only enables reduction in the original accelerator signal whereby the ISA system never provides for increased acceleration beyond that indicated by an unmodified APS signal; (6) passive/static (non-programmable) components are used to implement the signal processing circuits; (7) ECM-provided power supply to the acceleration pedal is monitored and a reversion to the default pass-through state of the ISA system/mechanical relay is triggered in the event of a supply failure; and (8) failure to communicate with the pedal interface for over 200 milliseconds automatically triggers a hardware reset with the ISA system/mechanical relay returning to its default pass-through state. The following sections expand in greater detail on each of these safety aspects and features of preferred ISA systems.

Defaulting to the Pass-Through State on Startup

At startup, a preferred ISA system checks if conditions from both the vehicle and the ISA system itself are met in order to enable an active mode of the ISA system, otherwise, the ISA system will remain in a deactivated, safe mode that is its default state. It is important to understand that in safe mode, the APS signals go directly to the ECM without modification; the APS signals bypass the pedal control module of the ISA system by operation of the mechanical relay. The APS signal will go through the pedal control module only if all the conditions are met in order for the safety supervisor to activate the mechanical relay. A summary of the two active and inactive operation modes is set forth in table 700 of FIG. 7.

Figure 8:
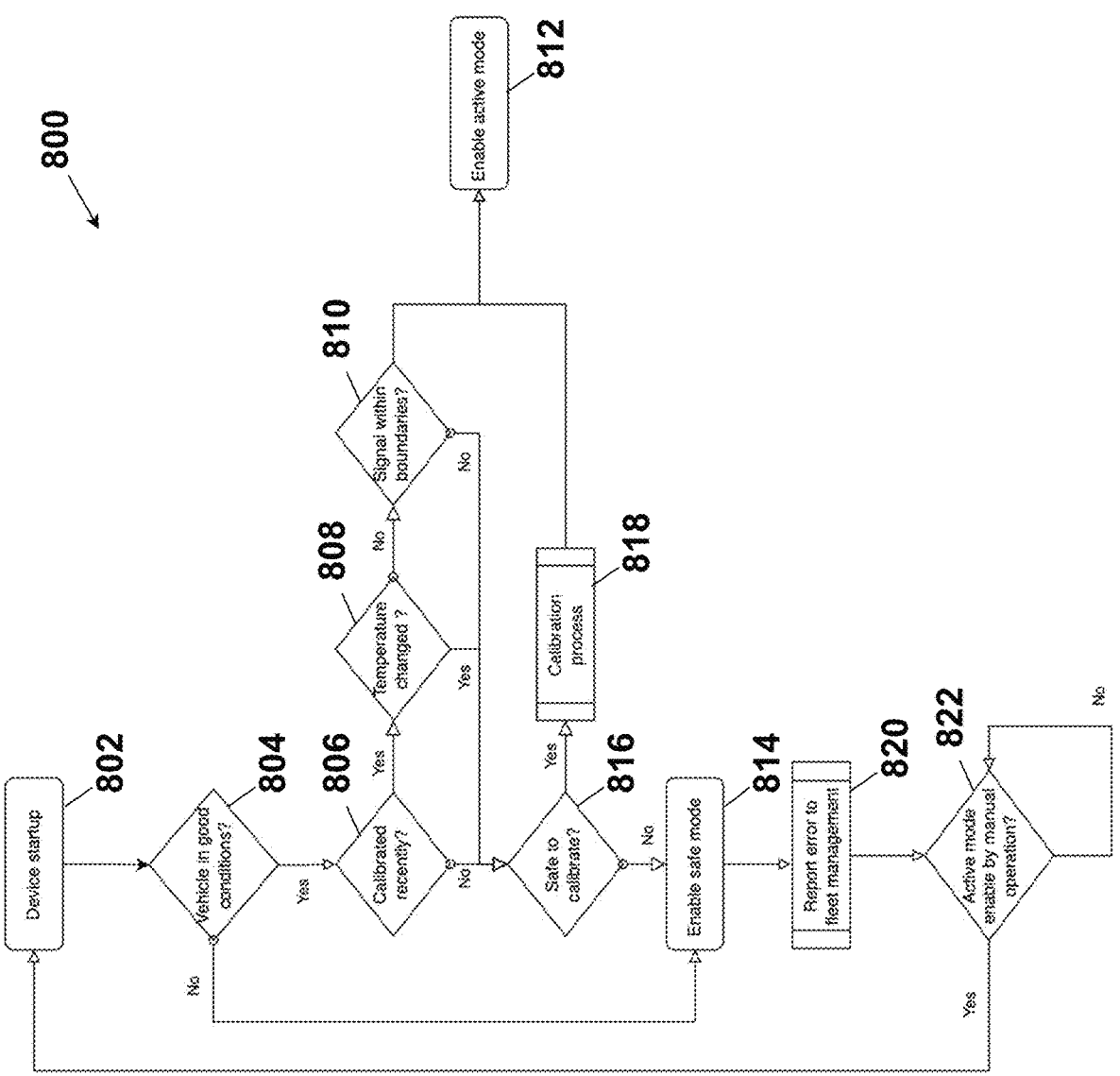
FIG. 8 illustrates steps of a method for checking prerequisite conditions on startup before activating a preferred ISA system.

Preferably, the active mode of a preferred ISA system will be enabled only if the certain conditions are met. FIG. 8 illustrates steps of a preferred method 800 for checking the prerequisite conditions on startup before activating a preferred ISA system.

The steps of the method 800 include, following powering up or startup of the ISA system at 802: checking that the vehicle is in good condition (step 804); and checking in series whether the ISA system was recently calibrated (step 806), whether there has been a material change in temperature possibly affecting the ISA system (step 808); and whether signals from the ISA system to the ECM are within the boundaries of the original APS signals from the accelerator pedal sensor as identified during profiling (step 810). If all of these determinations are in the affirmative, then active mode of the ISA system is enabled (step 812).

If the determination in step 804 is not in the affirmative, then safe mode of the ISA system is enabled (step 814).

If the determination in step 806 is not in the affirmative, the determination in step 808 is in the affirmative, of if the determination in step 810 is not in the affirmative, then a determination is made in step 816 whether it is safe to perform a calibration method of the ISA system. If this determination is made in the affirmative, then the calibration method is performed in step 818, after which if successful the active mode of the ISA system then is enabled (step 812).

If safe mode is enabled in step 814, then an error is reported to fleet management in step 820 and the ISA system while in safe mode awaits a manual reboot in step 822.

Those aforementioned conditions include, for example, conditions of the vehicle such as: a sufficient level of power of a battery of the vehicle; engine RPMs of the vehicle being above a preset threshold; the absence of an check-engine code related to the pedal; the VIN of the vehicle is the same as the one captured when the APS pedal calibration process was completed during installation of the preferred ISA system; and power supply to the pedal being stable.

The conditions also include conditions of the ISA system, such as: pedal control module APS signal outputs being within range; the ratio between primary and secondary signals being within the range; the APS signals being within their respective boundaries, both in terms of time and amplitude; and successful calibration of the ISA system.

If all of the conditions are not met and the ISA system thus remains in a deactivated state (its default/safe state), then there will be no impact on safety from any erroneous or unintended consequences from operation of the ISA system; in the deactivated state, all APS signals are mechanically connected from the vehicle pedal to ECM and bypass the pedal control module/ISA system via the mechanical relay.

Continuous Monitoring of Conditions for ISA System Operations

Figure 9:
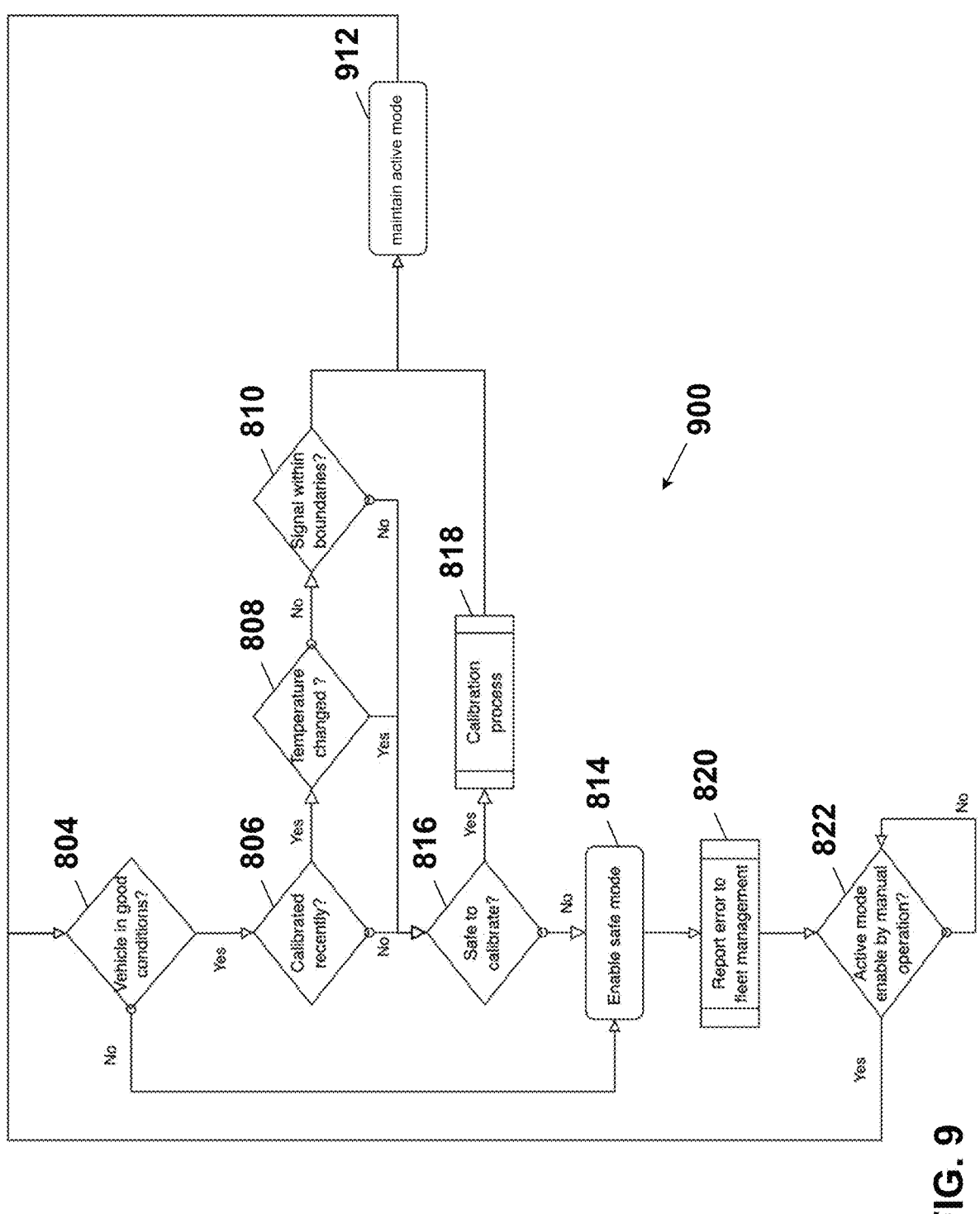
FIG. 9 illustrates steps of a method for repeatedly checking conditions during operations of a preferred ISA system to confirm that the ISA system should remain operational.

Certain conditions should be satisfied in order to have a preferred embodiment of an ISA System initially activated; however, it is also important to ensure that those conditions are continuously monitored and satisfied when a preferred ISA system is activated in order to detect if anything change such that those conditions are no longer met during runtime. In this respect, FIG. 9 illustrates steps of a method 900 for repeatedly checking conditions during operations of a preferred ISA system to confirm that the ISA system should remain operational. Essentially, the steps of the method 900 of FIG. 9 are the same as the steps of the method 800 of FIG. 8, but the method 900 is performed when a preferred ISA system is in an active mode. Step 812 of method 800 thus is replaced with step 912 in which the active mode of the ISA system is maintained.

In performing the calibration method in step 818, the signal processing circuits are bypassed by the APS signals and, instead, simulated APS signals are generated by an embedded signal generator of the ISA system for which the modified APS signals have been determined in a specific working instance of the ISA system, for example, the unmodified APS signals provided by the accelerator pedal sensor and the modified APS signals provided to the ECM during the activation self-check phase of the initialization method 600. The simulated APS signals that are generated within the ISA system mimic the known APS signals ("input reference signals"). These input reference signals simulating the known APS signals provided by the accelerator pedal sensor are passed through the signal processing circuits, and the resulting modified APS signals are compared to the known APS signals provided to the ECM ("output reference signals") in order to determine whether adjustments are required for calibrate operation of signal processing circuits.

Figure 10:
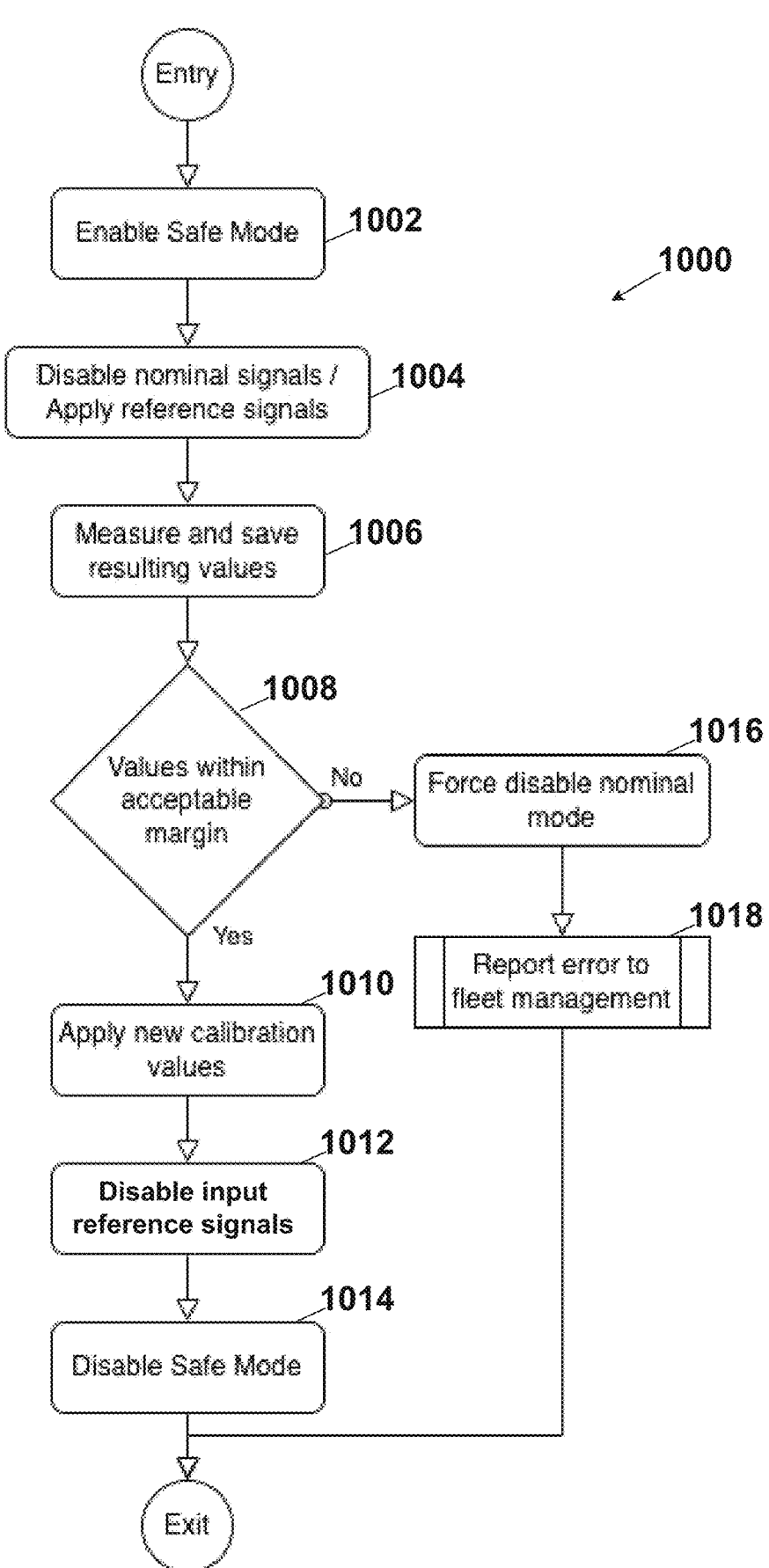
FIG. 10 illustrates steps of a preferred calibration method using reference signals.

The steps of a preferred calibration method 1000 using reference signals are shown in FIG. 10. The steps of the method 1000 comprise enabling safe mode (step 1002) such that the APS signals (the "nominal signals") bypass the signal processing circuits and are directly routed to the ECM and, in place thereof, applying input reference signals generated by the embedded signal generator to the signal processing circuits in mimicking the known APS signals (step 1004); measuring and saving values of the resulting modified APS signals (step 1006); determining whether those values are within an acceptable margin based on output reference signals (step 1008) and, if not, then adjusting modification values of the signal processing circuits and repeating steps 1006 and 1008 until acceptable.

If the adjustments do not result in acceptable values, then the method 1000 comprises forcing disabling of the active mode ("nominal mode") of the ISA system (step 1016) and reporting an error to the fleet management (step 1018). If the adjustments result in acceptable values, then the method 1000 includes applying any new adjusted modification values of the signal processing circuits ("new calibration values") to the signal processing circuits for use with nominal signals (step 1010); enabling routing of the nominal signals to the signal processing circuits again by disabling the input references signals (step 1012) and disabling safe mode (step 1014).

Preferably, the safety supervisor of the ISA system repeatedly checks that the conditions are within operational boundaries in order for the ISA system to remain active. If any of the conditions fail, then the ISA system is put into safe mode and a notification is provided to a fleet management that the ISA system is now inactive. An operator from the fleet will need to enable the active mode at a later stage through a web portal once the reason for deactivation has been identified and the issue resolved.

Digital and Analog Signal Processing Circuits with Independent Hardware Paths As mentioned earlier, a typical APS signal comprises two signals at a minimum. The two signals typically always have a specific ratio that they need to respect in order for an ECM to implement the acceleration or deceleration indicated by the primary signal. This is a safety mechanism that the ECM utilizes to make sure that the acceleration signal provided is valid and has not been corrupted. If the ratio is not respected, then the ECM will enter a limp mode corresponding to a released accelerator pedal (idling) and will no longer implement further acceleration signals.

Preserving the Original ECM Safety Mechanisms

The system complies with the ECM's safety mechanism by monitoring CAN messages continuously. As mentioned in the continuous monitoring section, if any pedal-related check engine is triggered, the system will automatically deactivate itself and the APS signal will be mechanically connected to the ECM.

APS Signal Subtraction Only

Preferably it is impossible, under any circumstances, to create unintended acceleration by the ISA system. Moreover, an APS signal determined to be from an IVS preferably is passed through to the ECM without any signal subtraction, as the IVS signal merely indicates a binary value and signal subtraction as contemplated herein would be inapplicable.

Accordingly, only modified APS signals indicating a pedal position within a range are subject to modification and such modification is only subtraction resulting in lesser acceleration. No modified APS signal is output that results in an increases acceleration over what would otherwise result from the unmodified APS signal.

Figure 11:
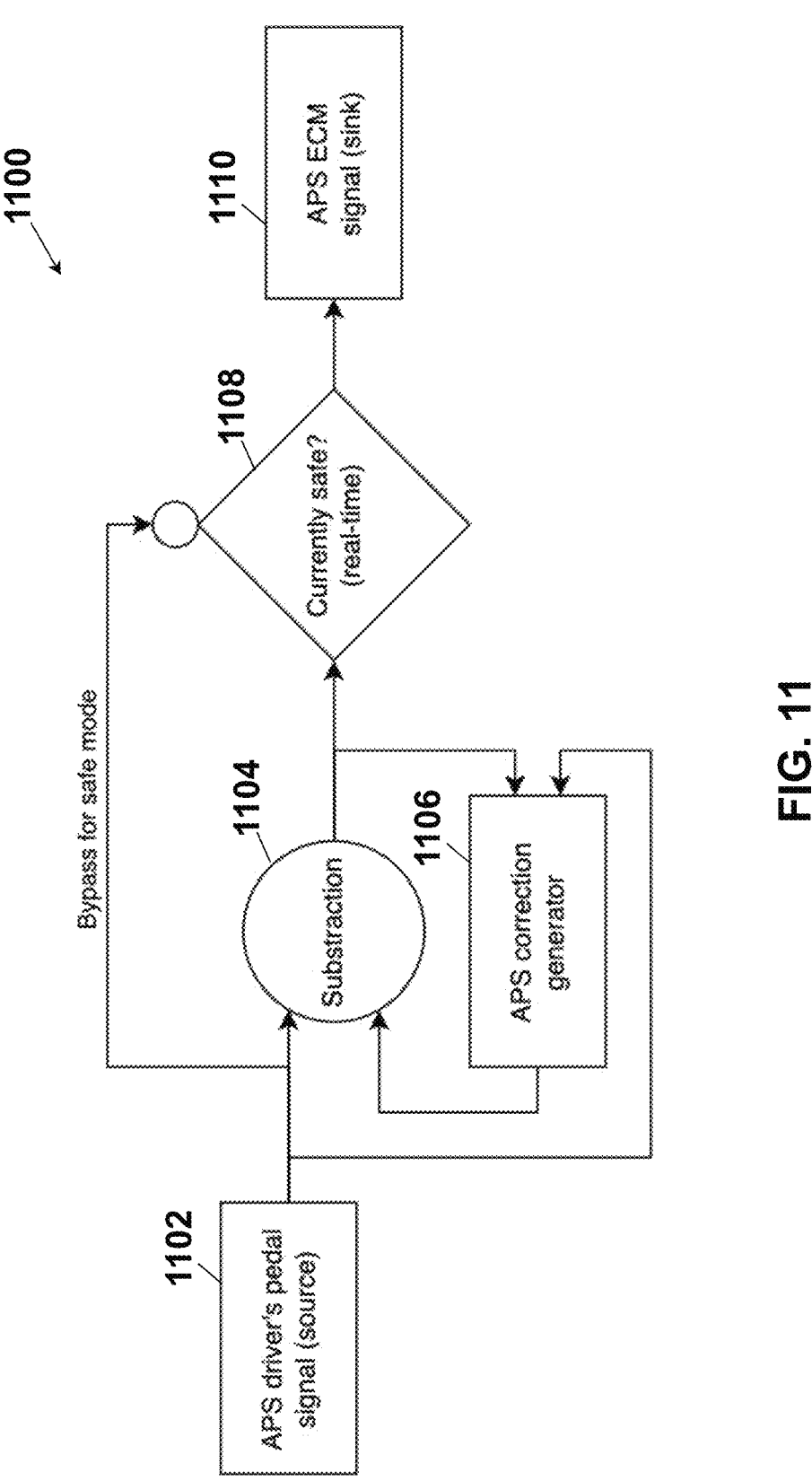
FIG. 11 illustrates a diagram regarding a preferred system for signal subtraction for analog APS signals.

In this regard, FIG. 11 illustrates a diagram of a preferred arrangement 1100 for APS signal subtraction. In the system 1100, an APS signal is generated by the accelerator pedal sensor (step 1102) and provided to a digital signal processing circuit that performs subtraction (step 1104). The APS signal is also provided to an APS correction generator (step 1106). If the ISA system is or enters into safe mode, then the APS signal generated in step 1102 bypasses the signal processing circuit and APS correction generator (step 1108) and the APS signal is provided to the ECM (step 1110). Otherwise, the modified APS signal resulting from the subtraction in step 1104 is provided to the ECM in step 1110.

Figure 12:
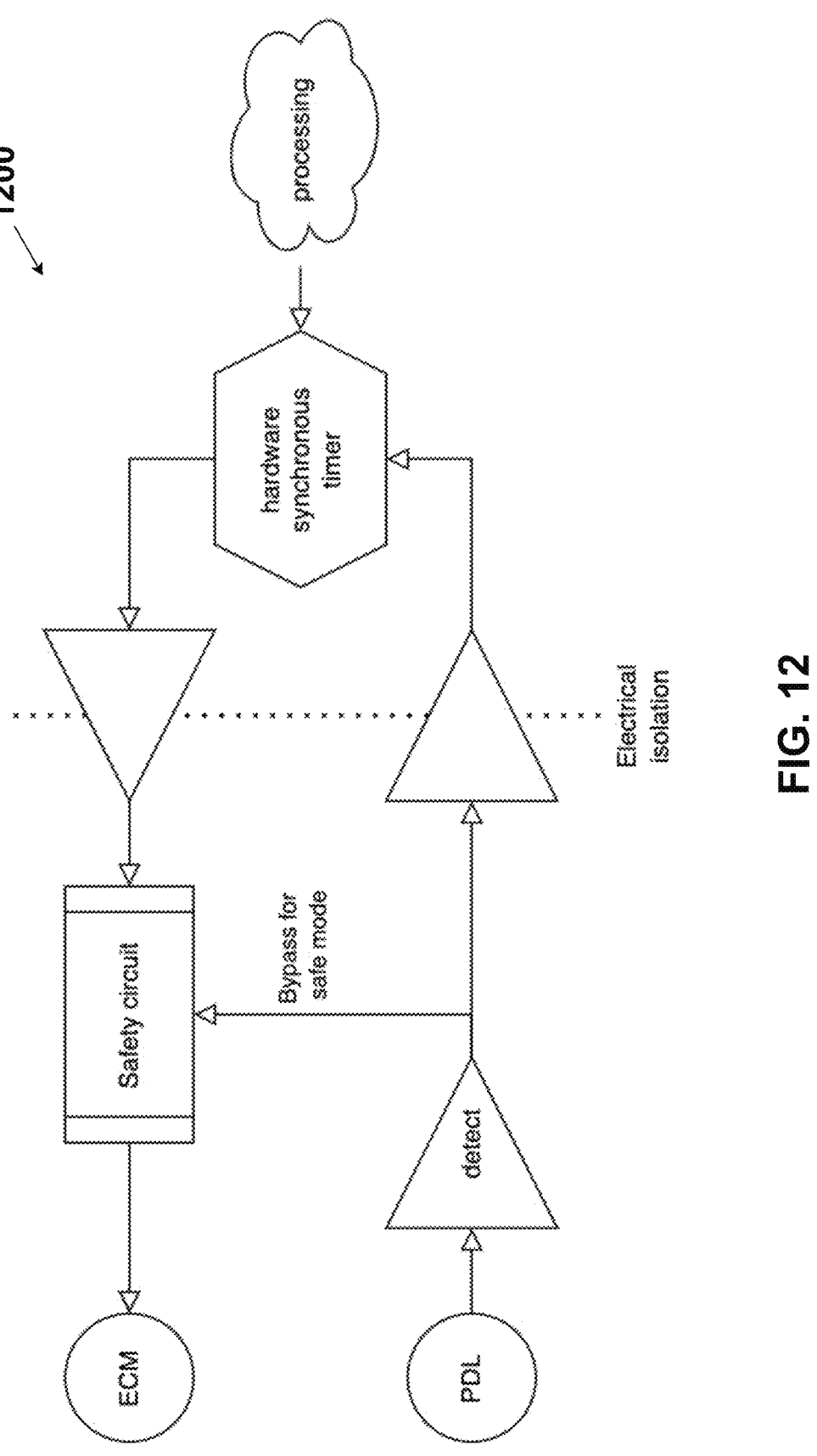
FIG. 12 illustrates another diagram regarding a preferred system for signal subtraction for analog APS signals.

FIG. 12 illustrates this via a preferred system 1200 and shows the use of electrical isolation and a hardware synchronous timer. To generate a valid modified APS signal, this signal must be precisely synchronized with its corresponding APS signal. This is accomplished with a specific observation circuit using the hardware synchronous timer that is capable of following the input APS signals. In particular, when a new period of an input APS signal starts is precisely detected and, using the timer synchronized to this input, a subtraction signal is generated and both are provided to the signal processing circuit where the unwanted part of the unmodified APS signal is removed.

In subtracting with regard to analog signals, the voltage is reduced in order to indicate a lesser pedal position and a resulting lesser indicated acceleration. In subtracting with regard to digital signals, logic gates are used to insure no intended acceleration occurs.

Figure 13:
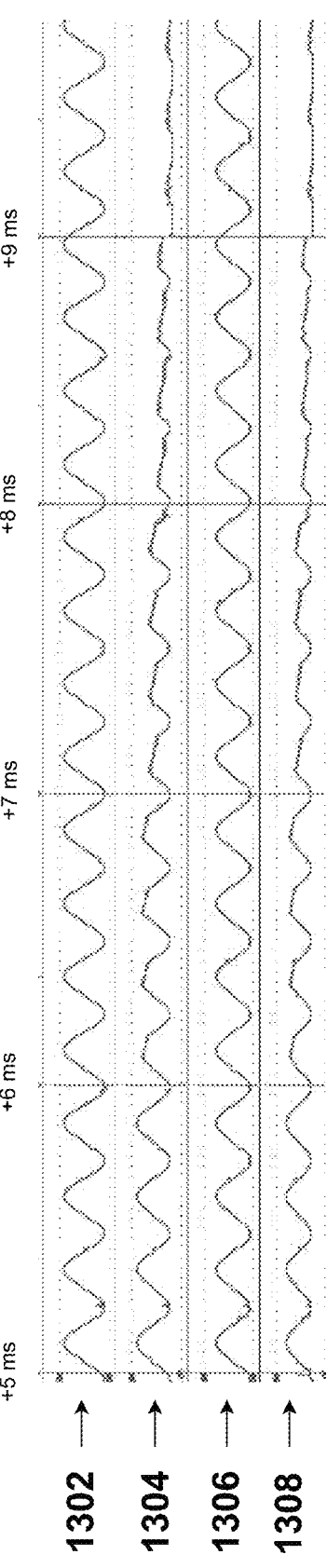
FIG. 13 illustrates four exemplary graphs of a pair of APS signals as provided from a pedal sensor and a corresponding pair of modified APS signals as provided to an ECM.

More specifically, regarding analog APS signals, the analog signal processing circuit can only filter down the APS signal being input from the accelerator pedal sensor. Essentially the only operation that the product is able to do on the input signal is a signal subtraction to prevent further acceleration when the vehicle reaches the speed limit. To illustrate, FIG. 13 provides exemplary graphs 1302,1304,1306, 1308 comparing and contrasting analog APS signals. It will be appreciated from review of these graphs that, as the vehicle gets closer to the allowed speed limit, the analog signal processing circuit progressively reduces the amplitude of the APS signals for preventing the vehicle from further accelerating beyond the allowed speed limit. In this respect, graph 1302 illustrates a primary analog APS signal as output from an accelerator pedal sensor where repeated periodic depression of an accelerator pedal have occurred to the maximum extent followed by complete release. Graph 1304 illustrates the primary analog APS signal after modification by the analog signal processing circuit, i.e., graph 1304 illustrates the APS signal that is received by the ECM in accordance with one or more preferred embodiments of the invention. Graph 1306 illustrates the corresponding validation signal as output from the pedal sensor, and graph 1308 illustrates the corresponding validation signal that is received by the ECM after the signal processing. Comparing and contrasting the APS signals output by the pedal sensor with the modified APS signals received by the ECM demonstrates the results of the signal subtraction that is performed as the vehicle approaches and reaches the allowed maximum speed limit determined by the ISA system.

Reduction with regard to digital APS signals is similar in principle but different in operation. For digital signals, logic gates are used that result in only subtraction of the indicated pedal position and consequent lesser acceleration.

In this regard, for active-high digital signals, an "AND" logic gate is used, which results in outputs as shown in graph 1400 of FIG. 14.

In particular, when the APS digital signal from the pedal sensor ("unmodified" APS digital signal) indicates a duty cycle greater than a "released pedal" boundary value, and the APS signal output from the digital signal processing circuit ("modified" APS digital signal) indicates a duty cycle greater than a "released pedal" boundary value but less than or equal to the duty cycle of the unmodified APS digital signal, then the modified APS signal is provided ("output") to the ECM (Scenario A).

In contrast, when the unmodified APS digital signal indicates a duty cycle corresponding to the "released pedal" boundary value, and the modified APS digital signal indicates a duty cycle greater than the duty cycle of the unmodified APS digital signal, then the unmodified APS digital signal is output (Scenario B); when both the unmodified and modified APS digital signals indicate a duty cycle corresponding to the "released pedal" boundary value, then the modified APS digital signal is output (Scenario C); and when the unmodified APS digital signal indicates a duty cycle greater than a "released pedal" boundary value, but the modified APS digital signal indicates a duty cycle corresponding to the "released pedal" boundary value, then the modified APS digital signal is output (Scenario D). Scenarios A, C, and D represent normal operations, whereas Scenario B indicates an error has occurred and preferably results in an error notification and deactivation of the ISA system.

For active-low digital signals, an "OR" logic gate is used, which results in outputs as shown in graph 1500 of FIG. 15.

In particular, when the APS digital signal from the pedal sensor ("unmodified" APS digital signal) indicates a duty cycle greater than a "released pedal" boundary value, and the APS signal output from the digital signal processing circuit ("modified" APS digital signal) indicates a duty cycle greater than a "released pedal" boundary value but less than or equal to the duty cycle of the unmodified APS digital signal, then the modified APS signal is provided ("output") to the ECM (Scenario A).

In contrast, when the unmodified APS digital signal indicates a duty cycle corresponding to the "released pedal" boundary value, and the modified APS digital signal indicates a duty cycle greater than the duty cycle of the unmodified APS digital signal, then the unmodified APS digital signal is output (Scenario B); when both the unmodified and modified APS digital signals indicate a duty cycle corresponding to the "released pedal" boundary value, then the modified APS digital signal is output (Scenario C); and when the unmodified APS digital signal indicates a duty cycle greater than a "released pedal" boundary value, but the modified APS digital signal indicates a duty cycle corresponding to the "released pedal" boundary value, then the modified APS digital signal is output (Scenario D). Scenarios A, C, and D represent normal operations, whereas Scenario B indicates an error has occurred and preferably results in an error notification and deactivation of the ISA system.

Static (Non-Programmable) Components in the Signal Processing Circuits

Preferably, the signal processing circuits are designed with passive/static (non-programmable) components such that the circuits cannot be repurposed from their original design intention by software changes, thus adding a layer of security.

Monitoring for and Preemptive Action from Faults in ECM-Provided Power Supply In order for the ISA system to match the operating range of the pedal, it has been discovered that it is important for the signal processing circuits to be powered by the same power supply as the accelerator pedal switch, which also powers the ECM. This power supply is constantly monitored, preferably at one millisecond intervals. Upon a supply failure (i.e., detection of a voltage outside the nominal operating range for a few milliseconds) the ISA system is deactivated and enters the inactive state. Once the power supply recovers, the ISA system re-enables itself up to a certain number of times and, failing that, the ISA system sends a request-for-maintenance notification. FIG. 16 illustrates an example of a pedal power supply failure, wherein the voltage is shown to drop and vary below a static ten volts that was previously being maintained.

Guaranteed Response Time for Glitch-Free Pedal Interface

Preferably an external watchdog circuit is positioned strategically in the isolated pedal interface to supervise the interface with the pedal subsystem. This watchdog circuit is maintained at a maximum interval of ⅛th of a second, otherwise, the activation relay is disabled and all IC in the isolated pedal interface revert to their respective reset state.

Aspects and Features: Maintaining Operation in Harsh Conditions

Because preferred ISA systems make use of passive/static components, which all have various levels of accuracy specifications, each installation of a preferred ISA system preferably is calibrated during the installation process in order to take into consideration the unique combination of its passive/static components. Failure to perform this calibration would hinder the ability of the ISA system to respect the ratio of the primary and secondary APS signals for controlling vehicle acceleration and resulting speed. A challenge is that accuracy of passive/static components will vary with external factors such as temperature. Thus, it is preferred that such calibration not only be performed with installation, but also be performed on a repeated basis during operation of the preferred ISA systems.

Embedded Calibration Capability for Reliable Pedal Signal Interfacing

An embedded signal generator serves as a constant reference to adjust to sensing drift and error caused by temperature change. This signal generator can be internally connected instead of the pedal interface. This allows our system to remain precise and compatible with a vehicle in which it is installed in any condition.

CONCLUSION

In view of the foregoing disclosure, it will be appreciated that preferred ISA systems of the invention provide compatible with many if not most or all of the different accelerator pedal sensors of vehicles; ensure safety at all times; and operate in the harsh environments in which vehicles are driven.

Conclusion: A System Compatible with all the Different Vehicle Types

To ensure compatibility with all the different types of vehicles, and to respect the time-sensitive ratio between the primary and secondary APS signals: a dedicated signal processing circuit for digital APS signals is used in combination with a dedicated signal processing circuit for analog APS signals; both signal processing circuits are used concurrently in accommodating analog and digital APS signals; and dynamic compensation is performed to compensate for a voltage drops in the APS signals resulting from the insertion and use of the ISA system between the APS and the ECM.

To ensure minimal influence on the vehicle ECM circuit and to replicate vehicle architecture, a common power domain is used for the pedal, ECM circuit, and signal processing circuits, which is separate from other power domains of the vehicle with other modules of the ISA system being part of the other power domains and with an isolation circuit serving as a buffering between the power domains for the ISA system; an open drain circuit and a totem-pole architecture is used on a digital interface, so whatever the output drive of the pedal, it can be replicated by the ISA system; utilizing dynamic compensation, the ISA system minimizes the impedance impact for both the pedal and ECM of the vehicle; and autonomous detection of vehicle operating parameters for both ECM communications and pedal interfaces reduces possibility of errors that could arise from manual intervention.

Conclusion: A System that is Safe at all Time

To ensure that preferred embodiments of ISA systems generate a safe signal at all times, the following aspects and features have been implemented: (1) when unpowered, APS signals are mechanically connected from the pedal to ECM—this means no safety impact on a hardware failure from the Active ISA System; (2) to ensure the generated signals are valid, continuous monitoring of the ECM-specific APS's message is monitored, and any discrepancy triggers the pass-through mode of the mechanical relay; (3) all signals uses sufficiently separated hardware from each other so a failure of one signal does not influence the other(s)—any failure of one or more signal(s) will trigger an error within the ECM and the ECM will disregard all subsequent APS signal(s) until reset; (4) the system doesn't override ECM safety mechanisms—if a check engine is detected, the system will automatically deactivate itself; (5) to generate a modified APS signal a subtraction approach is utilized in which the APS signal is reduced by a certain amount (i.e., the voltage is reduced or the duty cycle is reduced); (6) the signal processing circuits utilizes immutable components (non-programmable), thereby ensuring the circuits can only be used for their intended purposes; (7) ECM-provided supply to the pedal sensor is monitored and the system deactivates itself temporarily on supply lapse and/or failure; and failure to update the pedal interface for over 200 milliseconds will result in its automatic reset and will revert the system to its default safe state (pass-through).

With further regard to feature #5, it is additionally noted that this provides an ISA system that can only provide a modified APS signal to the ECM indicating a pedal position and resulting acceleration that is no greater than that indicated by the unmodified APS signal It is further noted that, depending on the type of APS signal, a different signal processing circuit is used, but always with the same approach of subtraction: for analog signals, a subtracting amplifier is used that takes the unmodified APS signal and subtracts from it a signal generated onboard the pedal control module for reducing the voltage; for active-high APS digital signals an AND logic gate is used; and for active-low APS digital signals an OR logic gate is used.

Conclusion: A System Able to Operate in the Harsh Environment of the Automotive Industry A continuous signal calibration system allows optimal signal modification for the entire lifecycle of the ISA system: to ensure the signal processing circuits are in good condition a periodic known signal is passed through each and compared with previously calibrated values; and any discrepancy results in adjustment if possible, and otherwise triggers deactivation of the ISA system.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A vehicle comprising:
(a) a pedal with a pedal sensor that is configured to output accelerator pedal sensor (APS) signals, at least one of which indicates a position of the accelerator pedal;
(b) an engine control module (ECM) that is configured to effect acceleration of the vehicle at different rates as a function of a position of the accelerator pedal indicated by an APS signal; and
(c) an intelligent speed adaptor (ISA) system that is configured to receive APS signals output from the pedal sensor and provide the output APS signals to the ECM, and that is configured to modify one or more of the output APS signals by changing the indicated position of the accelerator pedal before providing the output APS signals to the ECM, whereby the ISA system limits the speed of the vehicle to an allowed speed that is determined by the ISA system;
(d) wherein the ISA system comprises a pedal interface comprising a first signal processing circuit for modifying digital APS signals output from the pedal sensor and a second signal processing circuit for modifying analog APS signals output from the pedal sensor; and
(e) wherein the ISA system comprises an AND logic gate that is configured to determine, for each digital APS signal output from the pedal sensor that is an active-high signal, whether to provide a modified or an unmodified version of the output digital APS signal to the ECM.

2. The vehicle of claim 1, wherein
(i) the first signal processing circuits comprises a plurality of inputs each for receiving and processing APS signals output from the pedal sensor, and a corresponding number of outputs for providing modified and unmodified output APS signals to the ECM, and
(ii) the second signal processing circuit comprises a plurality of inputs each for receiving and processing APS signals output from the pedal sensor, and a corresponding number of outputs for providing modified and unmodified output APS signals to the ECM,
whereby the ISA system is compatible with pedal sensors that output analog APS signals, pedal sensors that output analog APS signals, and pedal sensors that output analog and digital APS signals.

3. The vehicle of claim 1, wherein the pedal interface comprising the first and second signal processing circuits is powered by a first power source that also powers the pedal sensor and the ECM, and wherein the ISA system comprises modules that are powered by a second, different power source and an insulation circuit for insulating power provided by the first power source from power provided by the second, different power source.

4. The vehicle of claim 1, wherein the ISA system is configured to change the position of the accelerator pedal indicated by an analog APS signal by reducing a voltage of the analog APS signal which voltage corresponds to the position of the accelerator pedal.

5. The vehicle of claim 4, wherein the ISA system comprises a synchronous timer for synchronizing a subtraction signal with the analog APS signal.

6. The vehicle of claim 4, wherein the extent of the determined voltage reduction is lessened based on a detected voltage drop arising from the passing of the analog APS signal through the ISA system and wherein detection of the voltage drop is repeatedly performed for dynamically compensating for changes in the voltage drop that may occur due to time and temperature.

7. The vehicle of claim 4, wherein the ISA system is not configured to increase the voltage of the analog APS signal.

8. The vehicle of claim 1, wherein the ISA system is configured to change the position of the accelerator pedal indicated by a digital APS signal output from the pedal sensor by reducing a duty cycle of said digital APS signal which duty cycle corresponds to the position of the accelerator pedal.

9. The vehicle of claim 8, wherein the ISA system is not configured to increase the duty cycle of the digital APS signal.

10. The vehicle of claim 1, wherein the ISA system further comprises an OR logic gate that is configured to determine, for each digital APS signal output from the pedal sensor that is an active-low signal, whether to provide a modified or an unmodified version of the output digital APS signal to the ECM for the output digital APS signals.

11. An intelligent speed adaptor (ISA) system comprising: (a) a pedal interface that is configured to receive accelerator pedal sensor (APS) signals output from a pedal sensor and provide the output APS signals to an engine control module (ECM), and that is configured to modify one or more of the output APS signals by changing an indicated position of the accelerator pedal before providing the output APS signals to the ECM, whereby the ISA system limits the speed of the vehicle to an allowed speed that is determined by the ISA system; (b) wherein the ISA system is configured to detect whether an APS signal output from the pedal sensor is digital or analog and, based on the detection, apply the APS signal to either a first signal processing circuit or second signal processing circuit; and (c) wherein the ISA system comprises an AND logic gate that is configured to determine, for each digital APS signal output from the pedal sensor that is an active-high signal, whether to provide a modified or an unmodified version of the output digital APS signal to the ECM.

12. The ISA system of claim 11, wherein the ISA system further comprises an OR logic gate that is configured to determine, for each digital APS signal output from the pedal sensor that is an active-low signal, whether to provide a modified or an unmodified version of the output digital APS signal to the ECM for each of the output digital APS signals.

13. The ISA system of claim 12, wherein:
(i) the first signal processing circuit comprises a plurality of inputs each for receiving and processing APS signals output from the pedal sensor, and a corresponding number of outputs for providing modified and unmodified output APS signals to the ECM, and
(ii) the second signal processing circuit comprises a plurality of inputs each for receiving and processing APS signals output from the pedal sensor, and a corresponding number of outputs for providing modified and unmodified output APS signals to the ECM,
whereby the ISA system is compatible with pedal sensors that output analog APS signals, pedal sensors that output analog APS signals, and pedal sensors that output analog and digital APS signals.

14. The ISA system of claim 12, wherein the ISA system is configured to change the position of the accelerator pedal indicated by an analog APS signal by reducing a voltage of the analog APS signal which voltage corresponds to the position of the accelerator pedal.

15. The ISA system of claim 12, wherein the ISA system comprises a synchronous timer for synchronizing a subtraction signal with the analog APS signal.

16. The ISA system of claim 14, wherein the extent of the voltage reduction is determined based on the allowed speed determined by the ISA system.

17. The ISA system of claim 14, wherein the ISA system is not configured to increase the voltage of the analog APS signal.

18. The ISA system of claim 12, wherein the ISA system is configured to change the position of the accelerator pedal indicated by a digital APS signal output from the pedal sensor by reducing a duty cycle of said digital APS signal which duty cycle corresponds to the position of the accelerator pedal.

19. The ISA system of claim 18, wherein the ISA system is not configured to increase the duty cycle of the digital APS signal.

20. An intelligent speed adaptor (ISA) system comprising: (a) a pedal interface that is configured to receive accelerator pedal sensor (APS) signals output from a pedal sensor and provide the output APS signals to an engine control module (ECM), and that is configured to modify one or more of the output APS signals by changing an indicated position of the accelerator pedal before providing the output APS signals to the ECM, whereby the ISA system limits the speed of the vehicle to an allowed speed that is determined by the ISA system; (b) wherein the ISA system is configured to detect whether an APS signal output from the pedal sensor is digital or analog and, based on the detection, apply the APS signal to either a first signal processing circuit or second signal processing circuit; and (c) wherein the ISA system comprises an OR logic gate that is configured to determine, for each digital APS signal output from the pedal sensor that is an active-low signal, whether to provide a modified or an unmodified version of the output digital APS signal to the ECM for each of the output digital APS signals.

* * * * *